(12) United States Patent
Magruder et al.

(10) Patent No.: US 8,271,465 B2
(45) Date of Patent: *Sep. 18, 2012

(54) PARALLEL NESTED TRANSACTIONS IN TRANSACTIONAL MEMORY

(75) Inventors: Michael M. Magruder, Sammamish, WA (US); David Detlefs, Issaquah, WA (US); John J. Duffy, Renton, WA (US); Goetz Graefe, Madison, WI (US); Vinod K. Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/027,938

(22) Filed: Feb. 15, 2011

(65) Prior Publication Data
US 2011/0138145 A1    Jun. 9, 2011

Related U.S. Application Data

(62) Division of application No. 11/901,647, filed on Sep. 18, 2007, now Pat. No. 7,890,472.

(51) Int. Cl.
*G06F 17/30* (2006.01)
(52) U.S. Cl. ............... 707/704; 707/703; 707/774
(58) Field of Classification Search ............... 707/609, 707/674, 687, 703, 704, 774; 711/118, 154, 711/167; 714/15
See application file for complete search history.

(56) References Cited

U.S. PATENT DOCUMENTS

| | | | |
|---|---|---|---|
| 5,251,318 A | 10/1993 | Nitta et al. | |
| 5,263,155 A | 11/1993 | Wang | |
| 5,687,363 A | 11/1997 | Oulid-Aissa et al. | |
| 5,721,909 A | 2/1998 | Oulid-Aissa et al. | |
| 5,764,977 A | 6/1998 | Oulid-Aissa et al. | |
| 5,835,757 A | 11/1998 | Oulid-Aissa et al. | |
| 5,983,225 A | 11/1999 | Anfindsen | |
| 6,052,695 A | 4/2000 | Abe et al. | |
| 6,295,610 B1 | 9/2001 | Ganesh et al. | |
| 6,343,339 B1 | 1/2002 | Daynes | |
| 6,351,735 B1 * | 2/2002 | Deaton et al. ............... | 705/14.25 |
| 6,578,033 B1 | 6/2003 | Singhal et al. | |
| 6,647,510 B1 | 11/2003 | Ganesh et al. | |
| 6,772,154 B1 | 8/2004 | Daynes | |
| 6,772,255 B2 | 8/2004 | Daynes | |
| 6,990,503 B1 | 1/2006 | Luo et al. | |
| 7,234,076 B2 | 6/2007 | Daynes et al. | |

(Continued)

OTHER PUBLICATIONS

Agrawal, Kunal, et al., "Nested Parallelism in Transactional Memory," The Second ACM SIGPLAN Workshop on Transactional Computing, pp. 1-12 (Aug. 16, 2007).

(Continued)

*Primary Examiner* — Jean M Corrielus

(57) ABSTRACT

Various technologies and techniques are disclosed for supporting parallel nested transactions in a transactional memory system. Multiple closed nested transactions are created for a single parent transaction, and the closed nested transactions are executed concurrently as parallel nested transactions. Various techniques are used to ensure effects of the parallel nested transactions are hidden from other transactions outside the parent transaction until the parent transaction commits. For example, versioned write locks are used with parallel nested transactions. When a transactional memory word changes from a write lock to a versioned write lock, an entry is made in a global versioned write lock map to store a pointer to a write log entry that the versioned write lock replaced. When the versioned write lock is encountered during transaction processing, the global versioned write lock map is consulted to translate the versioned write lock to the pointer to the write log entry.

4 Claims, 25 Drawing Sheets

U.S. PATENT DOCUMENTS

| | | | |
|---|---|---|---|
| 7,289,992 | B2 | 10/2007 | Walker |
| 7,418,706 | B1 | 8/2008 | Luo et al. |
| 7,478,210 | B2 | 1/2009 | Saha et al. |
| 7,496,574 | B2 | 2/2009 | Walker |
| 7,516,366 | B2 | 4/2009 | Lev et al. |
| 7,650,371 | B2 | 1/2010 | Duffy et al. |
| 7,840,530 | B2 * | 11/2010 | Magruder et al. ............ 707/609 |
| 7,840,540 | B2 * | 11/2010 | Kaminski, Jr. ................ 707/687 |
| 7,890,472 | B2 * | 2/2011 | Magruder et al. ............ 707/674 |
| 8,065,499 | B2 | 11/2011 | Dice et al. |
| 2007/0136365 | A1 | 6/2007 | Tarditi, Jr. et al. |
| 2007/0162520 | A1 | 7/2007 | Petersen et al. |
| 2007/0198519 | A1 | 8/2007 | Dice et al. |
| 2007/0198978 | A1 | 8/2007 | Dice et al. |
| 2008/0147757 | A1 | 6/2008 | Duffy et al. |
| 2009/0006407 | A1 | 1/2009 | Magruder et al. |
| 2009/0077082 | A1 | 3/2009 | Magruder et al. |
| 2009/0077083 | A1 | 3/2009 | Magruder et al. |
| 2010/0162249 | A1 | 6/2010 | Shpeisman et al. |
| 2010/0218195 | A1 * | 8/2010 | Adl-Tabatabai et al. ..... 718/107 |
| 2011/0145637 | A1 * | 6/2011 | Gray et al. ...................... 714/15 |

OTHER PUBLICATIONS

Dice, Dave, et al., "What Really Makes Transactions Faster?," First ACM SIGPLAN Workshop on Languages, Compilers, and Hardware Support for Transactional Computing, pp. 11 (Jun. 2006).

Dice, Dave, et al., "Transactional Locking II," Lecture Notes in Computer Science, vol. 4167 pp. 194-208 (Sep. 2006).

McDonald, Austen, et al., "Architectural Semantics for Practical Transactional Memory," Proceedings of the 33rd Annual International Symposium on Computer Architecture, pp. 12 (2006).

Moravan, Michelle, J. et al., "Supporting Nested Transactional Memory in LogTM," Proceedings of the 12th International Conference on Architectural Support for Programming Languages and Operating Systems (ASPLOS), pp. 1-12 (Oct. 21-25, 2006).

Moss, J. Eliot, et al., "Nested Transactional Memory: Model and Architecture Sketches," Science of Computer Programming, vol. 2, No. 63, pp. 1-16 (2006).

The Office Action for U.S. Appl. No. 11/901,483 mailed Nov. 16, 2009 (10 pages).

The Final Office Action for U.S. Appl. No. 11/901,483 mailed May 20, 2010 (9 pages).

The Notice of Allowance for U.S. Appl. No. 11/901,483 mailed Feb. 7, 2011 (9 pages).

The Office Action for U.S. Appl. No. 11/901,494 mailed Nov. 16, 2009 (9 pages).

The Notice of Allowance for U.S. Appl. No. 11/901,494 mailed Mar. 29, 2010 (16 pages).

The Office Action for U.S. Appl. No. 11/901,647 mailed Nov. 16, 2009 (10 pages).

The Final Office Action for U.S. Appl. No. 11/901,647 mailed May 14, 2010 (9 pages).

The Notice of Allowance for U.S. Appl. No. 11/901,647 mailed Oct. 7, 2010 (14 pages).

The Written Opinion of the International Searching Authority for International Application No. PCT/US2008/076563 mailed Mar. 18, 2009 (4 pages).

The International Search Report for International Application No. PCT/US2008/076563 mailed Mar. 18, 2009 (3 pages).

The Written Opinion of the International Searching Authority for International Application No. PCT/US2008/076564 mailed Mar. 31, 2009 (3 pages).

The International Search Report for International Application No. PCT/US2008/076564 mailed Mar. 31, 2009 (2 pages).

The Written Opinion of the International Searching Authority for International Application No. PCT/US2008/076565 mailed Mar. 18, 2009 (3 pages).

The International Search Report for International Application No. PCT/US2008/076565 mailed Mar. 18, 2009 (3 pages).

The Supplemental European Search Report for International Application No. PCT/US2008/076563 mailed Oct. 6, 2011 (9 pages).

The Restriction Requirement for U.S. Appl. No. 12/913,596 mailed Jun. 15, 2011 (6 pages).

The Office Action for U.S. Appl. No. 12/913,596 mailed Sep. 7, 2011 (13 pages).

The Final Office Action for U.S. Appl. No. 12/913,596 mailed Dec. 9, 2011 (6 pages).

Advisory Action for U.S. Appl. No. 12/913,596 mailed Feb. 16, 2012 (3 pages).

Notice of Allowance for U.S. Appl. No. 12/913,596 mailed Mar. 21, 2012 (8 pages).

* cited by examiner

PARALLEL NESTED TRANSACTIONS IN TRANSACTIONAL MEMORY

CROSS REFERENCE TO RELATED APPLICATIONS

This is a divisional of application Ser. No. 11/901,647, filed Sep. 18, 2007, the specification of which is incorporated by reference herein.

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. In other words, a transaction accesses data in one or more objects. An object in the context of transactional memory is a set of connected memory locations that are locked as one entity. An object in this context might also be a static variable, or a set of such variables, or it might be a set of cache lines.

STM is used as an alternative to traditional locking mechanisms. STM allows concurrent programs to be written more simply. A transaction specifies a sequence of code that is supposed to execute as if it were executing in isolation. This illusion of isolation is achieved by fine-grained locking of objects, and by executing in a mode that allows the side-effects of the transaction to be rolled back if the transaction is discovered to be in conflict with some other transaction. We say that a data access is "transacted" if the code generated for that access has been modified to include support for these locking and rollback mechanisms.

Transactions may be nested, and can be classified as open or closed nested. If a thread is currently executing a transaction and reaches the start of a new atomic block, this atomic block is executed as a closed nested child transaction of the currently-executing parent. This nested transaction executes within the same isolation boundary as the enclosing transaction, and just like other memory accessed within the enclosing transaction, the effects of the nested transaction will only become visible when the enclosing transaction commits. In other words, the parent transaction is effectively suspended, and the closed nested transaction is allowed to run to completion before processing in the parent is resumed. When a nested transaction rolls back, its temporary effects are undone and the state of the parent transaction is restored to the point that the nested transaction began.

The "outermost" transaction being executed by a given thread is not nested; we call this the top-level transaction. This top-level transaction must execute atomically, so the nested transactions become part of it. Nesting could arise, for example, if some abstractions A and B each had internal representation invariants they wanted to maintain even in use by concurrent threads, and they therefore used atomic blocks in the implementations of their methods to guarantee that these invariants are not violated by concurrent accesses. Now assume that some higher-level abstraction C uses instances of A and B in its implementation, and has some invariant that relates these A and B instances. Methods of C might use transactions to ensure that this invariant is not violated. If A and B methods are used inside C's transactions, the transactions in the A and B methods will be nested (in this use).

Current transactional memory systems do not allow work performed within the isolation boundary of one transaction to be distributed between multiple concurrent threads of execution. In current systems, a transaction may have only one nested child transaction. The semantics of such systems simply do not allow such parallelism within a transaction, and attempts to execute more than one nested transaction at a time would result in nested transaction log entries intermixed without order in the parent's log and other errors, and a breakdown of the basic underlying fine grained locking protocols used to provide the illusion of isolation.

SUMMARY

Various technologies and techniques are disclosed for supporting parallel nested transactions in a transactional memory system. Multiple closed nested transactions are created for a single parent transaction, and the closed nested transactions are executed concurrently as parallel nested transactions. Various techniques are used to ensure effects of the parallel nested transactions are hidden from other transactions outside the parent transaction until the parent transaction commits.

In one implementation, versioned write locks are used with parallel nested transactions. When a transactional memory word changes from a write lock to a versioned write lock, an entry is made in a global versioned write lock map to store a pointer to a write log entry that the versioned write lock replaced. When the versioned write lock is encountered during transaction processing, the global versioned write lock map is consulted to translate the versioned write lock to the pointer to the write log entry.

In another implementation, the release of a duplicate write lock for rollback is supported for parallel transactions. During rollback processing of a parallel nested transaction, a first write log entry is encountered that represents a write lock. If the write lock is determined to be a duplicate, a global lock is acquired and used to synchronize access to a global versioned write lock map.

In yet another implementation, optimistic read validation is supported for parallel nested transactions. During optimistic read validation, if a versioned write lock indicates a conflict from a sibling parallel nested transaction, then information is consulted to determine if a parallel nested transaction should be doomed. In one implementation, that information is contained in a versioned write lock and in a global versioned write lock map.

In yet a further implementation, write lock acquisition is supported for parallel nested transactions. Upon attempting to acquire a write lock for a parallel nested transaction, a transactional memory word is read and analyzed to determine if the write lock can be obtained. If the transactional memory word indicates a versioned write lock, a global versioned write lock map is accessed to retrieve a write log entry pointer that points to a first write log entry.

In yet another implementation, pessimistic reads are supported for parallel nested transactions. A pessimistic duplication detection data structure is created for a parallel nested transaction. An entry is made into the data structure for each pessimistic read in the parallel nested transaction. When committing the parallel nested transaction, new pessimistic read locks are passed to an immediate parent, and an entry is made into a separate pessimistic duplication detection data structure of the immediate parent with synchronization between sibling transactions. The pessimistic duplication detection data structures can also be used for upgrades from pessimistic reads to write locks.

In another implementation, retry operations are supported with parallel nested transactions. When a transaction that is a parallel nested transaction or a child transaction of the parallel nested transaction executes a retry, a read set of the transaction is registered for the retry. When a decision is made to propagate the retry past a parallel nested transaction parent of the transaction, the read set is kept registered and made part of a parent read set.

In yet a further implementation, write abort compensation maps can be used with parallel nested transactions to detect and handle falsely doomed parent transactions. A write abort compensation map is created when releasing new write locks for a parallel nested transaction during rollback. When the parallel nested transaction rolls back, an entry is created in the write abort compensation map for each new write lock released.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

As noted in the background section, a nested transaction is considered closed if it its effects are part of the same isolation boundary as its containing, or parent, transaction. Using various technologies and techniques described herein, a transaction may have multiple closed nested transactions at the same time. These are called "parallel nested transactions" (PNTs). All of the PNTs under a single enclosing transaction are called the "parallel children" of the transaction, and the enclosing transaction is called the "parallel parent". The parallel parent and its children are referred to as a "parallel nest". A "sibling" of a PNT is another PNT enclosed (at some nesting level) within the same parallel parent. In one implementation, each PNT executes much like a normal closed nested transaction: its effects are isolated within the enclosing transaction and only become visible beyond the parallel nest when the parallel parent commits. However, each PNT is isolated from its siblings just as if it were a top-level transaction. The effects of a PNT only become visible to its siblings when it commits.

Figure 1:
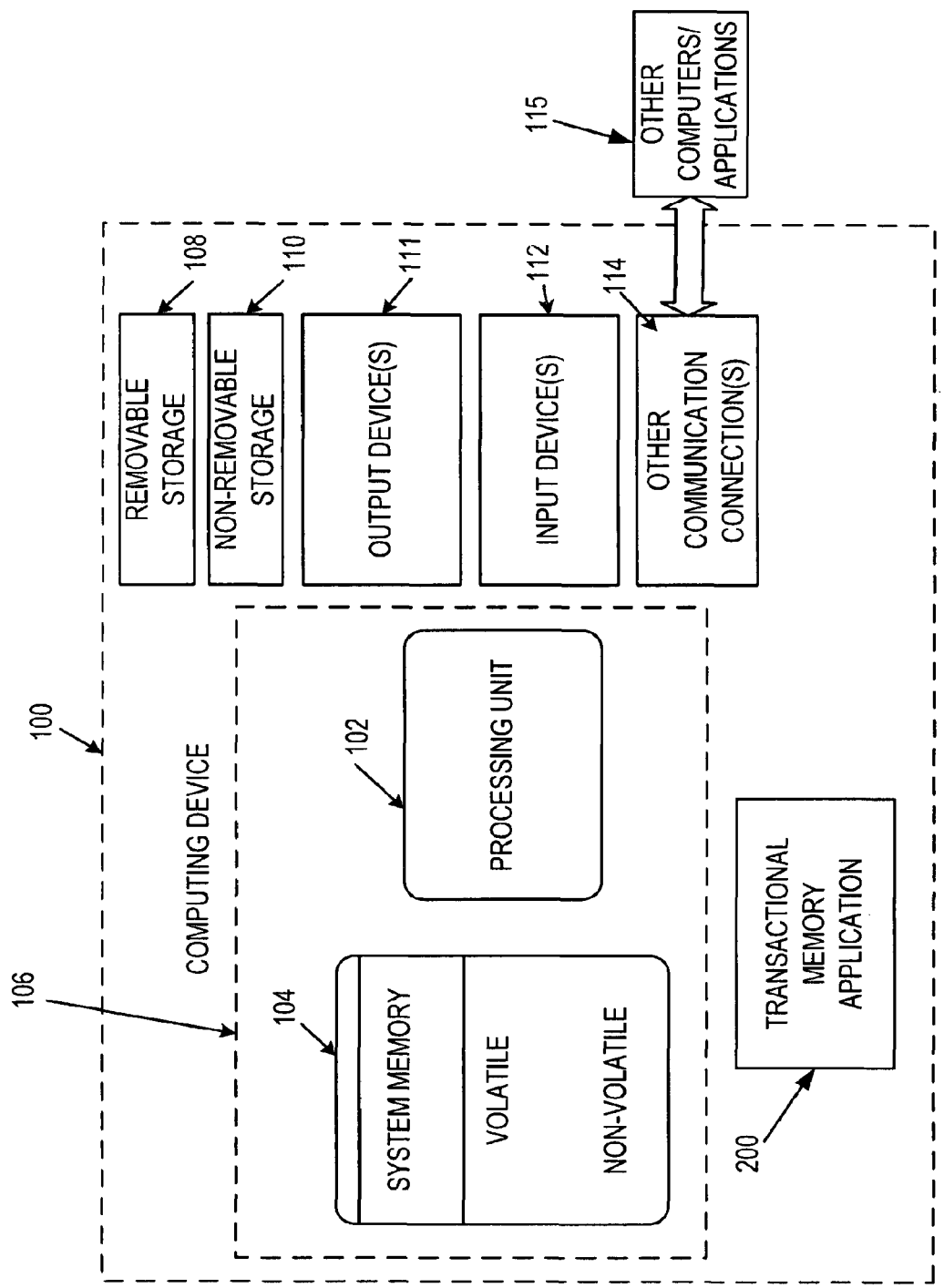
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/ functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
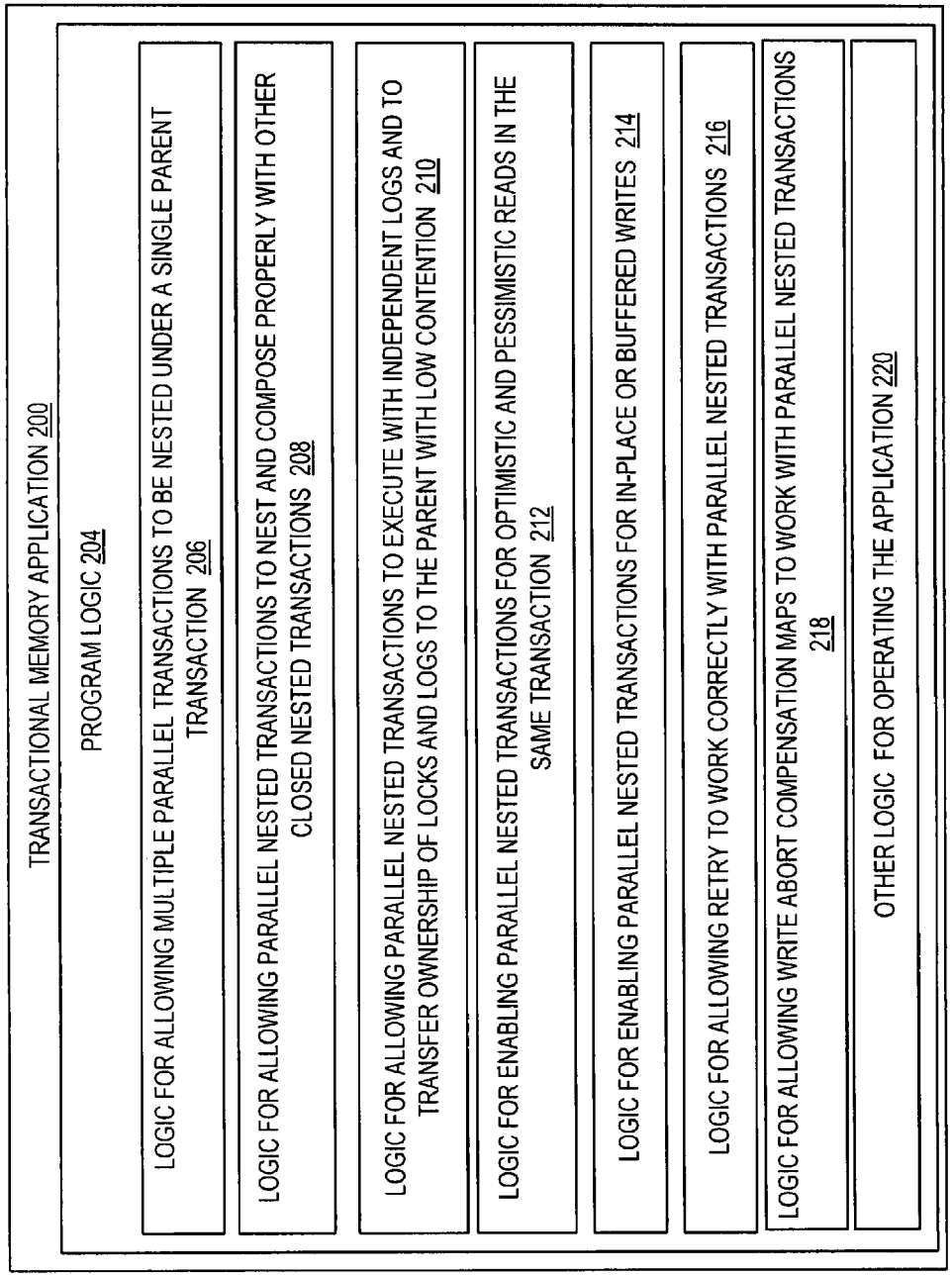
FIG. 2 is a diagrammatic view of a transactional memory application of one implementation operating on the computer system of FIG. 1.

Turning now to FIG. 2 with continued reference to FIG. 1, a transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for allowing multiple parallel transactions to be nested under a single parent transaction 206 (as described below with respect to FIG. 3); logic for allowing parallel nested transactions to nest and compose properly with other closed nested transactions 208 (as described below with respect to FIGS. 7-14); logic for allowing parallel nested transactions to execute with independent logs and to transfer ownership of locks and logs to the parent with low contention 210 (as described below with respect to FIGS. 4 and 5); logic for enabling parallel nested transactions for optimistic and pessimistic reads in the same transaction 212 (as described below with respect to FIGS. 15-17); logic for enabling parallel nested transactions for in-place or buffered writes 214 (as described below with respect to FIGS. 7, 11 and 12); logic for allowing retry to work correctly with parallel nested transactions 216 (as described below with respect to FIG. 18); logic for allowing write abort compensation maps to work with parallel nested transactions 218 (as described below with respect to FIG. 19); and other logic for operating the application 220.

Figure 3:
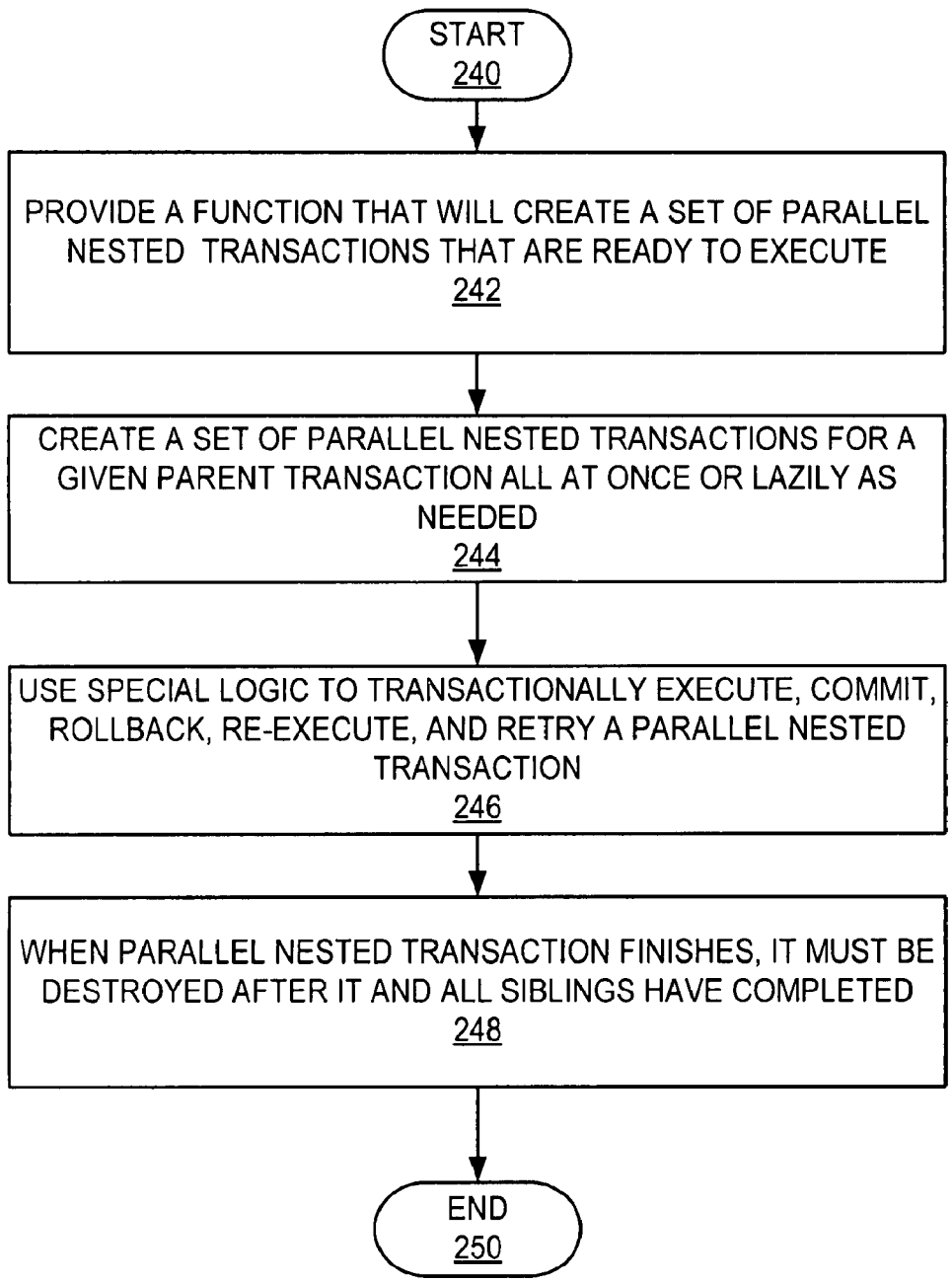
FIG. 3 is a process flow diagram for one implementation of the system of FIG. 1 that illustrates the stages involved in allowing multiple parallel transactions to be nested under a single parent transaction.

Turning now to FIGS. 3-19 with continued reference to FIGS. 1-2, the stages for implementing one or more implementations of transactional memory application 200 are described in further detail. In some implementations, the processes of FIGS. 3-19 are at least partially implemented in the operating logic of computing device 100. FIG. 3 illustrates one implementation of the stages involved in allowing multiple parallel transactions to be nested under a single parent transaction. The process begins at start point 240 with providing a function or other feature that will create a set of parallel nested transactions that are ready to execute (stage 242). A set of parallel nested transactions are created for a given parent transaction all at once or lazily as needed (stage 244). Special logic is used to transactionally execute, commit, rollback, re-execute, and retry a parallel nested transaction (stage 246). When a parallel nested transaction finishes, it must be destroyed after it and all of its parallel siblings have completed (stage 248). The process ends at end point 250.

Figure 4:
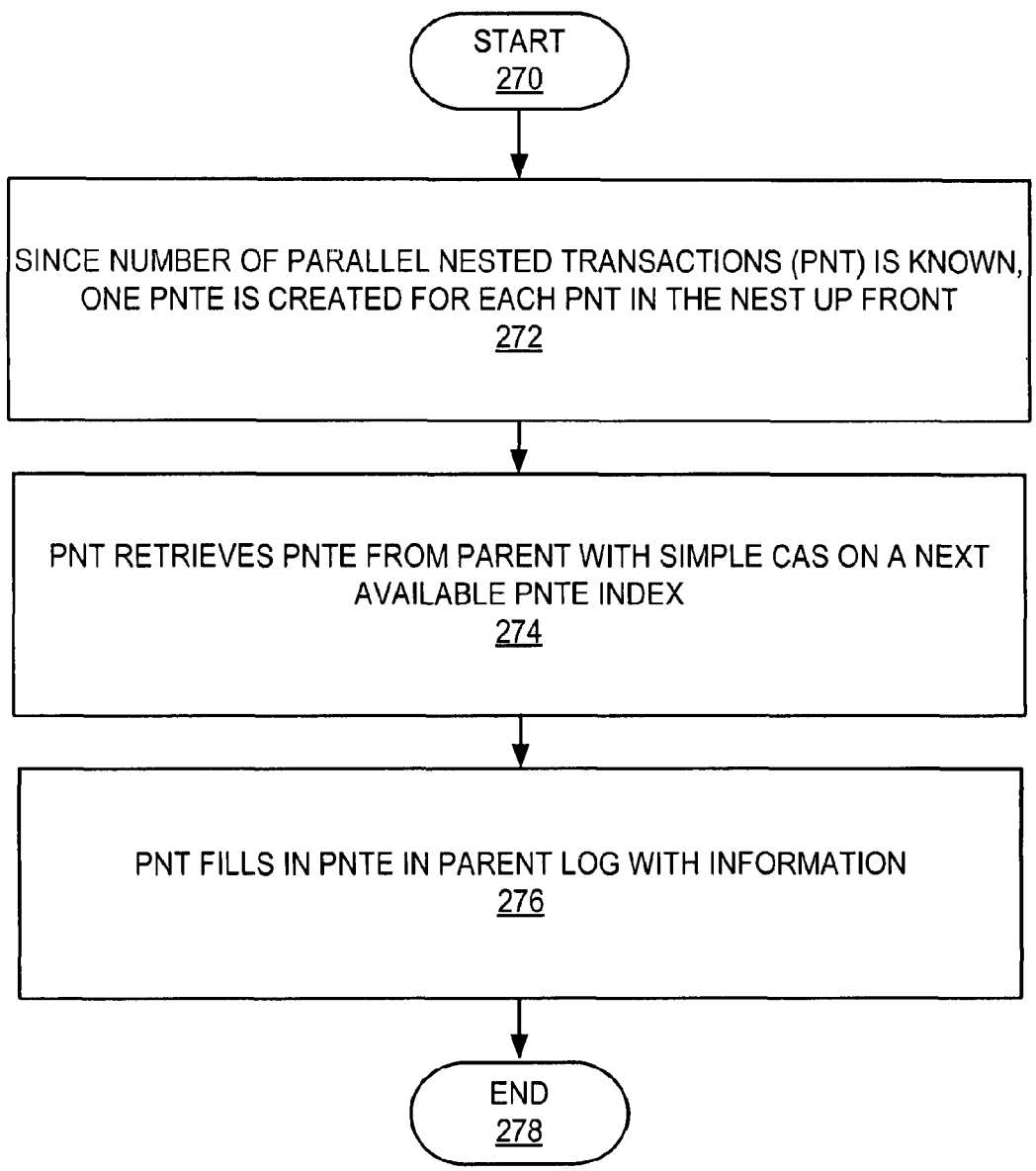
FIG. 4 is a process flow diagram for one implementation of the system of FIG. 1 that illustrates the stages involved in allocating parallel nested transaction entries in the parent log when the number of parallel nested transactions is known up front.
Figure 5:
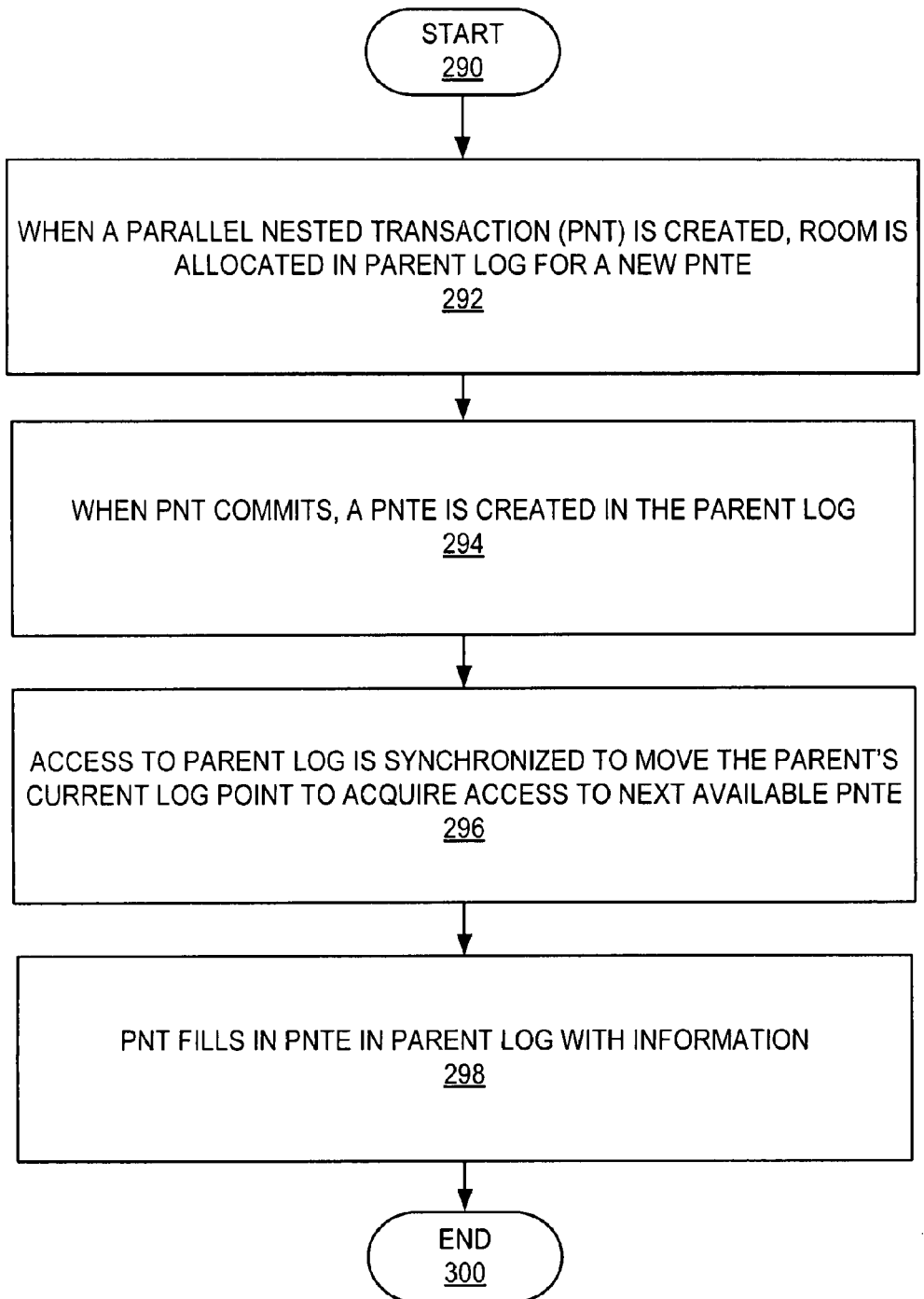
FIG. 5 is a process flow diagram for one implementation of the system of FIG. 1 that illustrates the stages involved in allocating parallel nested transaction entries in the parent log when the number of parallel nested transactions is not known up front.

FIGS. 4 and 5 illustrate how to allocate parallel nested transaction entries in the parent log. Parallel nested transactions are able to execute with independent logs and to transfer ownership of locks, logs, and other data to the parent with low contention after being allocated according to one of the allocation techniques described in FIGS. 4 and 5. Turning now to FIG. 4, one implementation is shown for allocating parallel nested transaction entries in the parent log when the number of parallel nested transactions is known up front. The process begins at start point 270 with one parallel nested transaction entry (PNTE) being created for each parallel nested transaction (PNT) in the nest before any PNT begins execution, since the number of parallel nested transactions is known up front (stage 272). When needed during rollback or commit processing, the parallel nested transaction retrieves the parallel nested transaction entry from the parent transaction with minimal synchronization. In one implementation, the preallocated PNTE are held in an array in the parent transaction. A PNT may obtain a pointer to the next available PNTE with a simple compare and swap operation on a next available parallel nested transaction index (stage 274). A compare and swap (CAS) is an operation that atomically performs a comparison between a given value and the contents of a given memory location, and if they match a given new value is stored in the memory location. If they do not match, then no action is taken. There are many methods to perform a CAS operation, some hardware and some software, on many different CPU's and operating systems. The term CAS as used herein is meant to generically cover all of these methods.

The parallel nested transaction fills in the parallel nested transaction entry in the parent log with information (stage 276). In one implementation, the information includes a pointer to the child's log and a pointer to the write abort compensation map for the child and/or pessimistically read object table, if applicable. The write abort compensation map is described in further detail in FIG. 19. The pessimistically read object table is described in more detail in FIG. 15. The process ends at end point 278.

FIG. 5 illustrates one implementation of the stages involved in allocating parallel nested transaction entries in the parent log when the number of parallel nested transactions is not known up front. The process begins at start point 290 with allocating room in the parent log for a new parallel nested transaction entry when a parallel nested transaction is created (stage 292). When the parallel nested transaction commits, a parallel nested transaction entry is created in the parent log (stage 294). Access to the parent log is synchronized to move the parent's current log point to acquire access to the next available space for a parallel nested transaction entry (stage 296). The parallel nested transaction fills in the parallel nested transaction entry in the parent log with information (stage 298). In one implementation, the information includes a pointer to the child's log and a pointer to the write abort compensation map for the child and/or pessimistically read object table, if applicable. The write abort compensation map is described in further detail in FIG. 19. The pessimistically read object table is described in more detail in FIG. 15. The process ends at end point 300.

Figure 6:
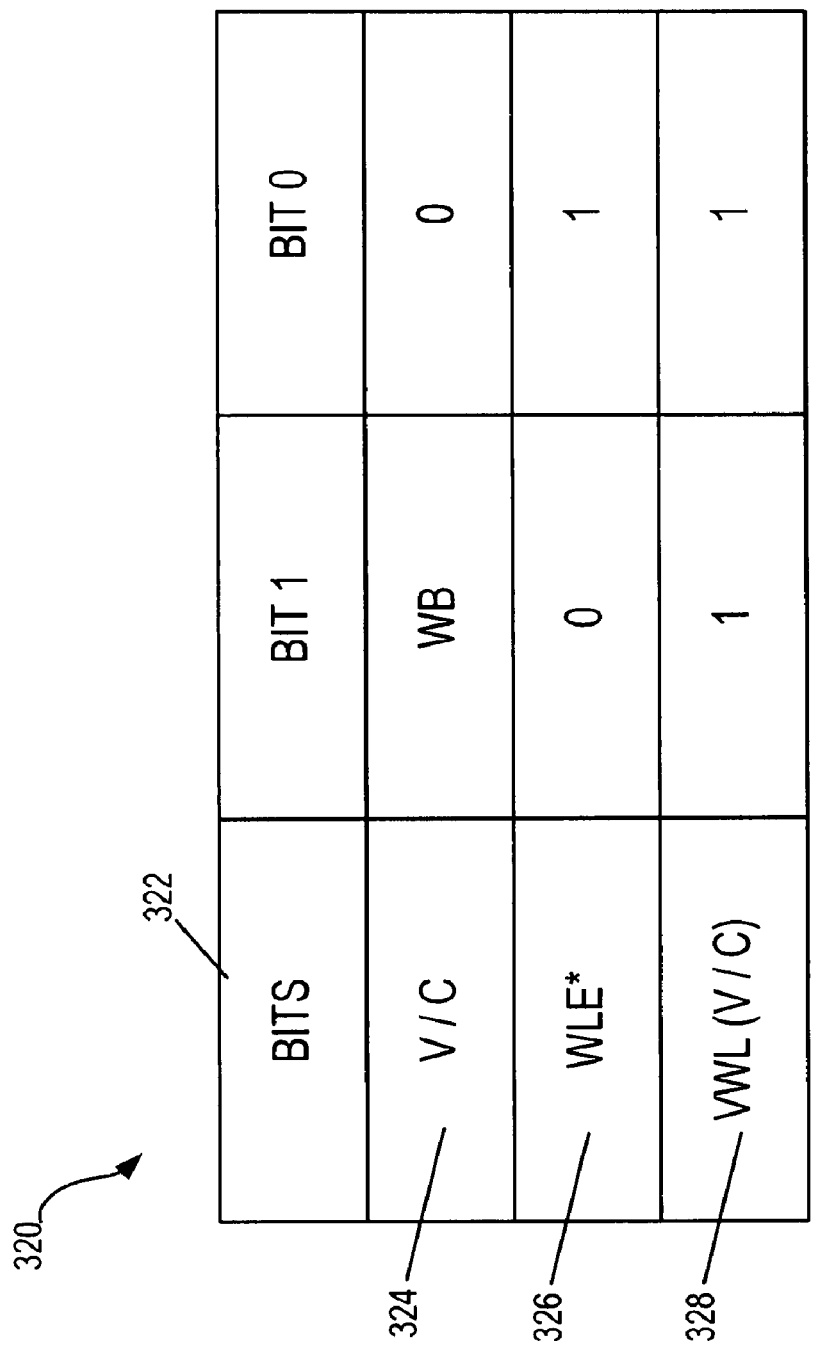
FIG. 6 illustrates an example structure of a transactional memory word of one implementation.

FIG. 6 illustrates an example structure 320 of a transactional memory word (TMW) of one implementation with various bits 322 being used to mark various lock statuses. In one implementation, a TMW is associated with each object. In one implementation, a single hardware word representation is used; but numerous other representations for TMWs are possible that allow for locking information to be stored. In the example structure described herein, a TMW may indicate that the associated object is write-locked or is not. One bit of the TMW is dedicated to this distinction. If a TMW is not write-locked, then it contains a version number and a count of pessimistic readers called a version/count pair 324 (V/C pair). In this state, some number of bits of the TMW record the version number of the object, and remaining bits represent a count of the number of transactions that currently hold a pessimistic read lock on the object. When a transaction holds a write lock in the object, this lock can be of two kinds (distinguished by a further bit in the TMW). Normally, the remaining bits of a write-locked TMW contain a pointer to an entry in the write log of the locking transaction 326; this write log entry (WLE) contains other information about the object and the locking For example, it might contain the TMW value for the object before the write lock was obtained; in another implementation, it might contain a "shadow copy" of the object into which uncommitted modifications are made. In the other state, a write-locked TMW contains a versioned write lock (VWL). Here, the remaining bits of the TMW (called VWL [V/C] 328) represent the version number of the object while it is still write locked and a count of pessimistic readers, similar to a V/C pair.

Before moving on to more detailed discussions on how versioned write locks are used, let's first explore an example that will help illustrate the need for versioned write locks (VWL's). Suppose there is an in-place STM system, and a top-level transaction Tx1 that acquires a write lock on object O1. The TMW for O1 is set to WLE1, which is a write log entry in Tx1's log representing Tx1's write lock on O1. Now, suppose two PNT's are introduced, Tx2 and Tx3, with Tx1 as the parallel parent. Tx2 and Tx3 are siblings in the parallel nest, and are executed concurrently. Tx2 and Tx3 may access data locked by Tx1, but they must be isolated from each other. Therefore, while Tx2 and Tx3 may both access O1, they must not be allowed to do so concurrently. Now, suppose Tx3 wishes to read from O1. It performs an optimistic read operation, creating an optimistic read log entry in its log recording the value of O1's TMW as WLE1. Next, assume that Tx2 writes to O1. Tx2 will acquire a write lock on O1, and set the TMW for O1 to WLE2, which is a write log entry in Tx2's log. WLE2 records that WLE1 is the previous value of O1's TMW. Tx2 may now write to fields of O1, and does so with in-place writes. As Tx3 continues to execute, it reads fields of O1 that contain uncommitted writes from Tx2. Tx3 is by definition doomed and should rollback. However, if Tx2 rolls back for any reason before Tx3 attempts to commit, then it must release its write lock on O1. To do this, Tx2 would normally set O1's TMW back to WLE1. But now when Tx3 attempts to commit, it will see that O1's TMW contains the same value that it did when Tx3 first read O1. In this situation, Tx3 will appear valid, and will fail to recognize that it read uncommitted writes from Tx2. Therefore, when Tx2 rolls back it must set O1's TMW to some value other than WLE1, and it must do this in a way that ensures that other transactions in the system (PNT siblings or other top-level transactions) recognize that O1 is still write locked by Tx1. This is accomplished by setting O1's TMW to a versioned write lock (VWL) and making an entry in the global versioned write lock map (VWLM) that indicates Tx1 holds a write lock on O1. The details and use of VWL's and the VWLM are described below. This example illustrates one case where a VWL is necessary. However, it will be appreciated by one of ordinary skill in the art that there are numerous scenarios where a VWL can be used, as will become apparent as the processes for lock acquisition and release are described in detail in the rest of this section.

Figure 7:
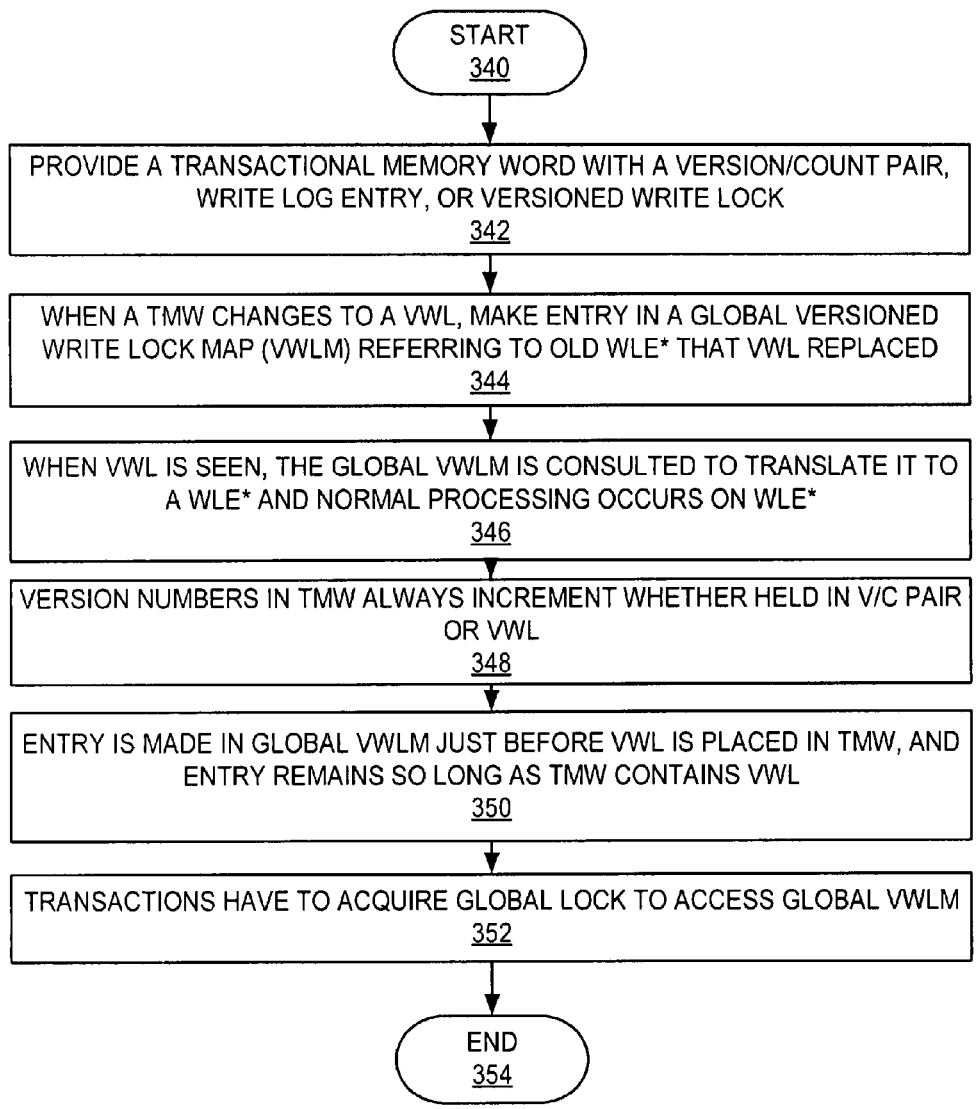
FIG. 7 is a process flow diagram for one implementation of the system of FIG. 1 illustrating the stages involved in using versioned write locks to ensure parallel nested transactions nest and compose properly.

FIG. 7 illustrates one implementation of the stages involved in using versioned write locks to ensure parallel nested transactions nest and compose properly. The process begins at start point 340 with providing a transactional memory word which can be one of a version/count pair, a write log entry (WLE), or a versioned write lock (VWL) (stage 342). When a transactional memory word (TMW) changes to a versioned write lock, an entry is made in a global versioned write lock map (VWLM), which is indexed by the object address, referring to the old write log entry pointer that the versioned write lock replaced (stage 344). When the versioned write lock is seen, the global versioned write lock map is consulted to translate it to a write log entry pointer and normal processing occurs on the write log entry pointer (stage 346). Version numbers in the transactional memory word always increment during commit or abort processing, whether held in a V/C pair or a versioned write lock (stage 348). An entry is made in the global versioned write lock map just before the versioned write lock is placed in the transactional memory word, and the entry remains so long as the transactional memory word contains the versioned write lock (stage 350). At any point in time, the transactions have to acquire a global lock to access the global versioned write lock map (stage 352). The process ends at end point 354.

Figure 8:
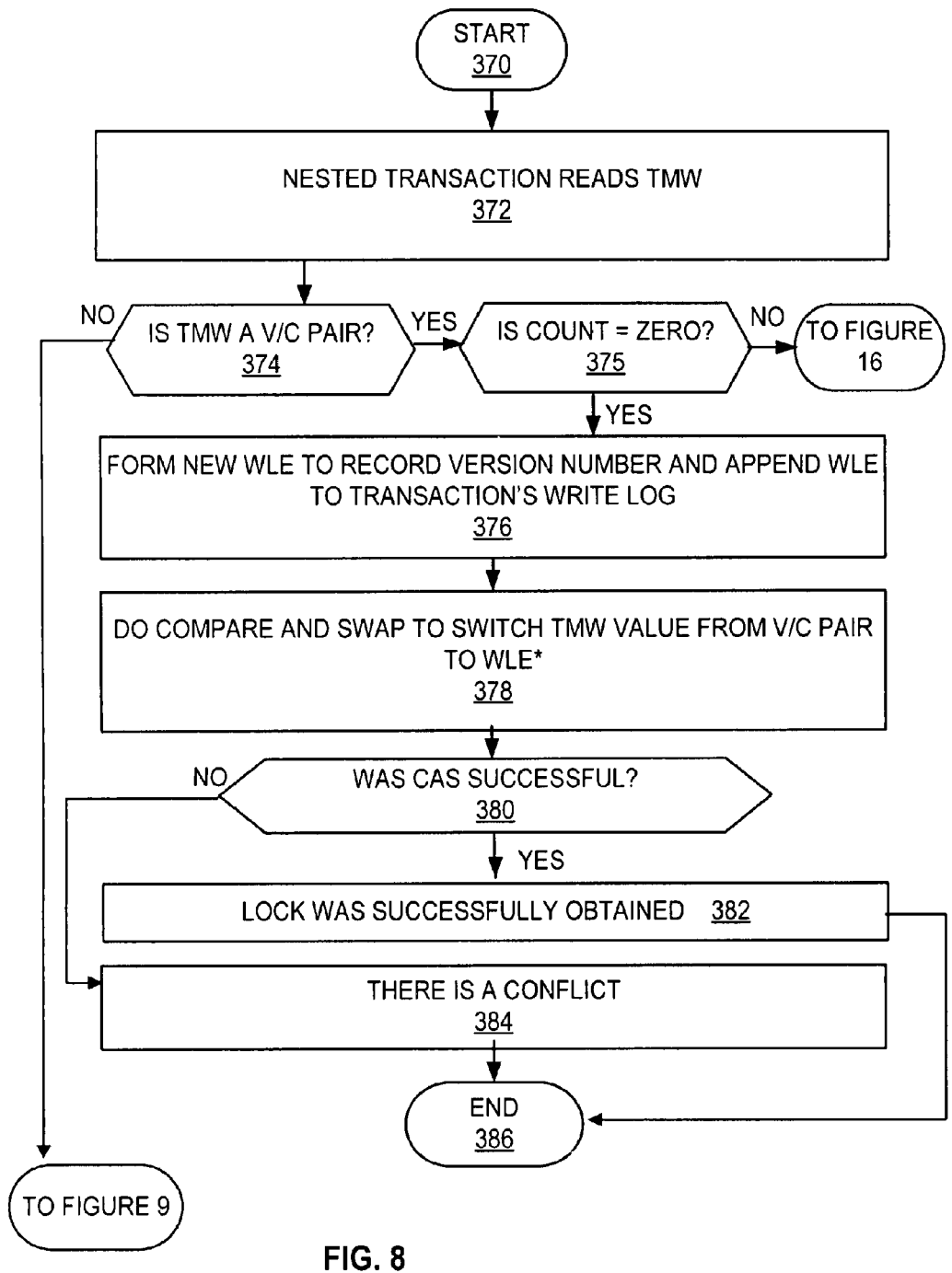
FIGS. 8 and 9 are process flow diagrams for one implementation of the system of FIG. 1 illustrating the stages involved in properly handling a nested transaction acquiring a write lock.
Figure 9:
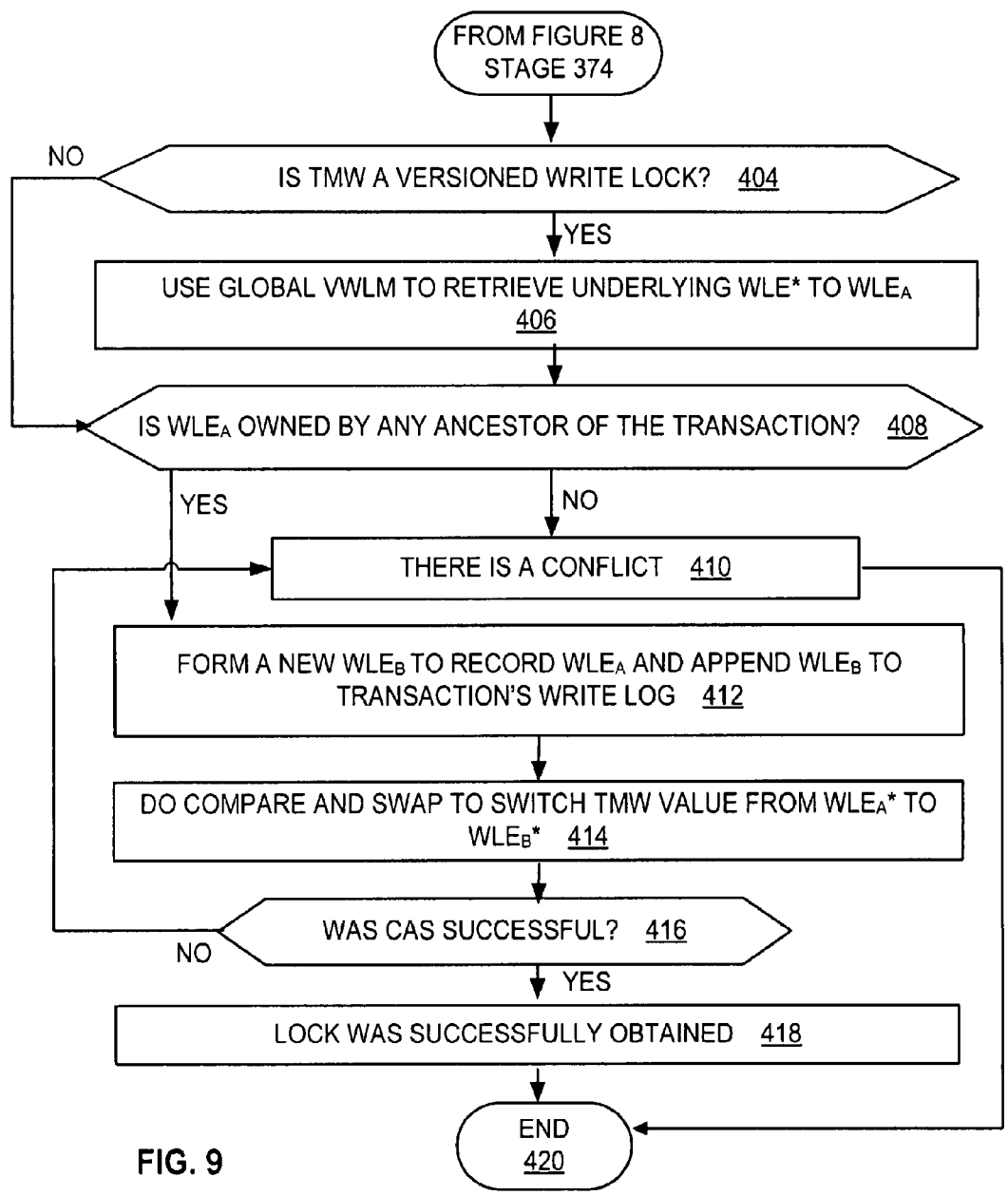
Figure 16:
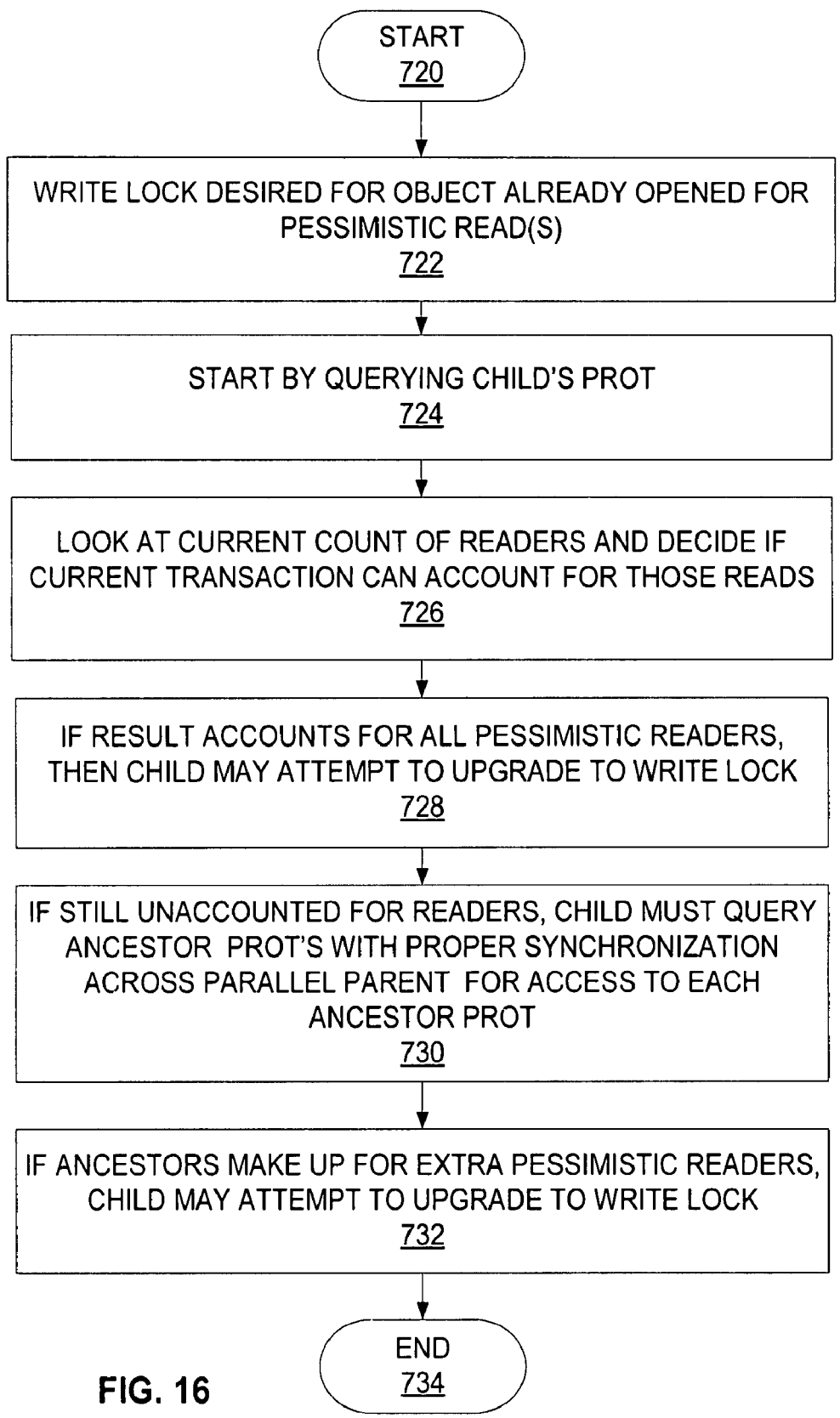
FIG. 16 is a process flow diagram for one implementation of the system of FIG. 1 that illustrates the stages involved in upgrading pessimistic read locks to write locks.
Figure 17:
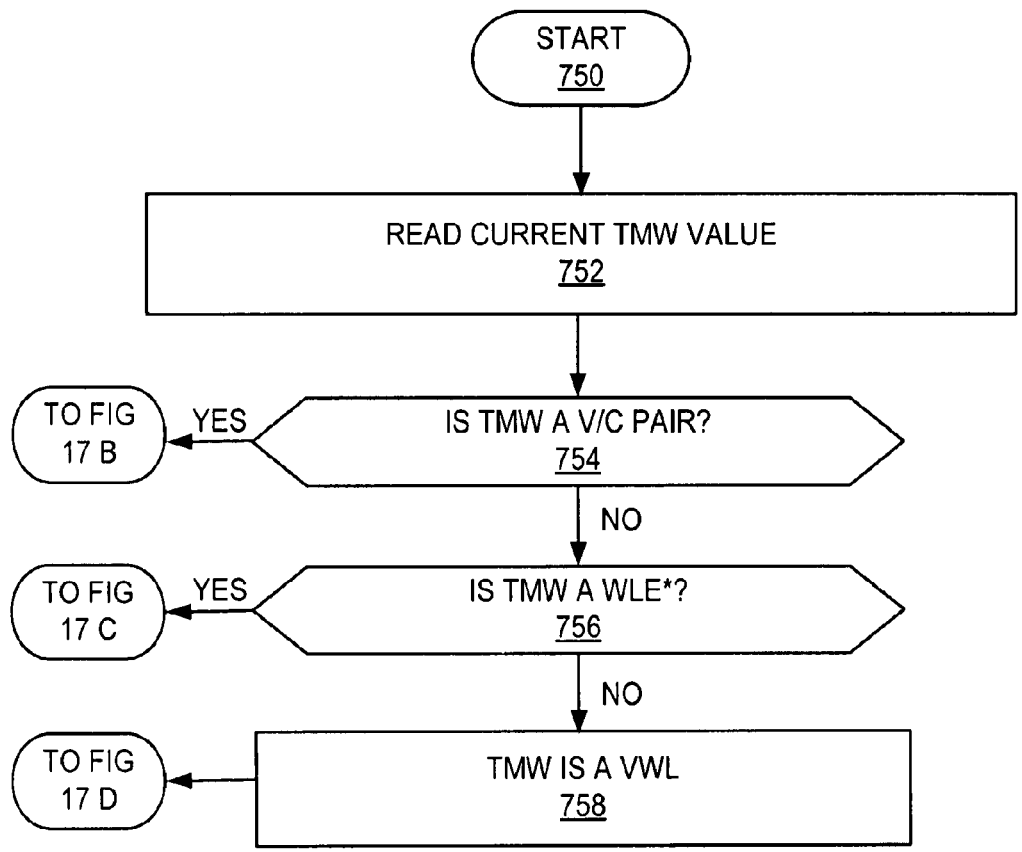
FIGS. 17A-17D are process flow diagrams for one implementation of the system of FIG. 1 that illustrates performing pessimistic read lock acquisition.
Figure 17:
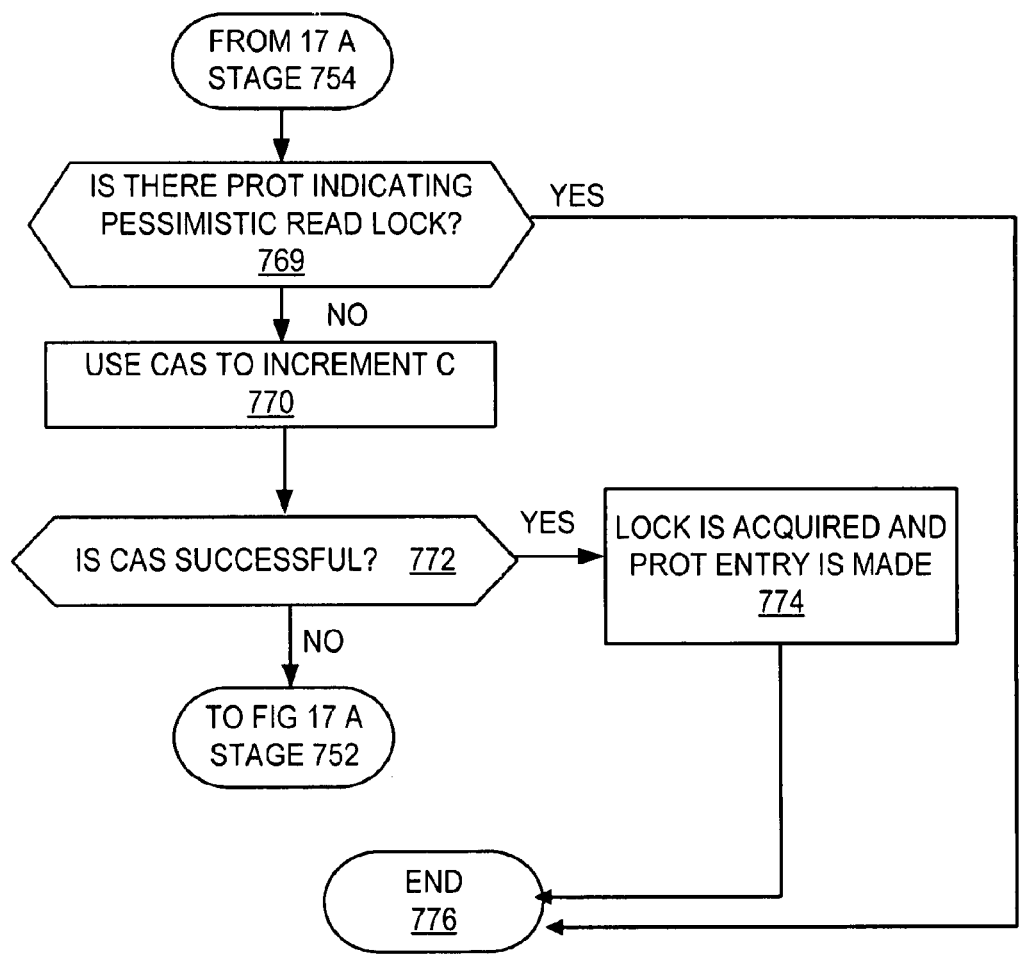
Figure 17:
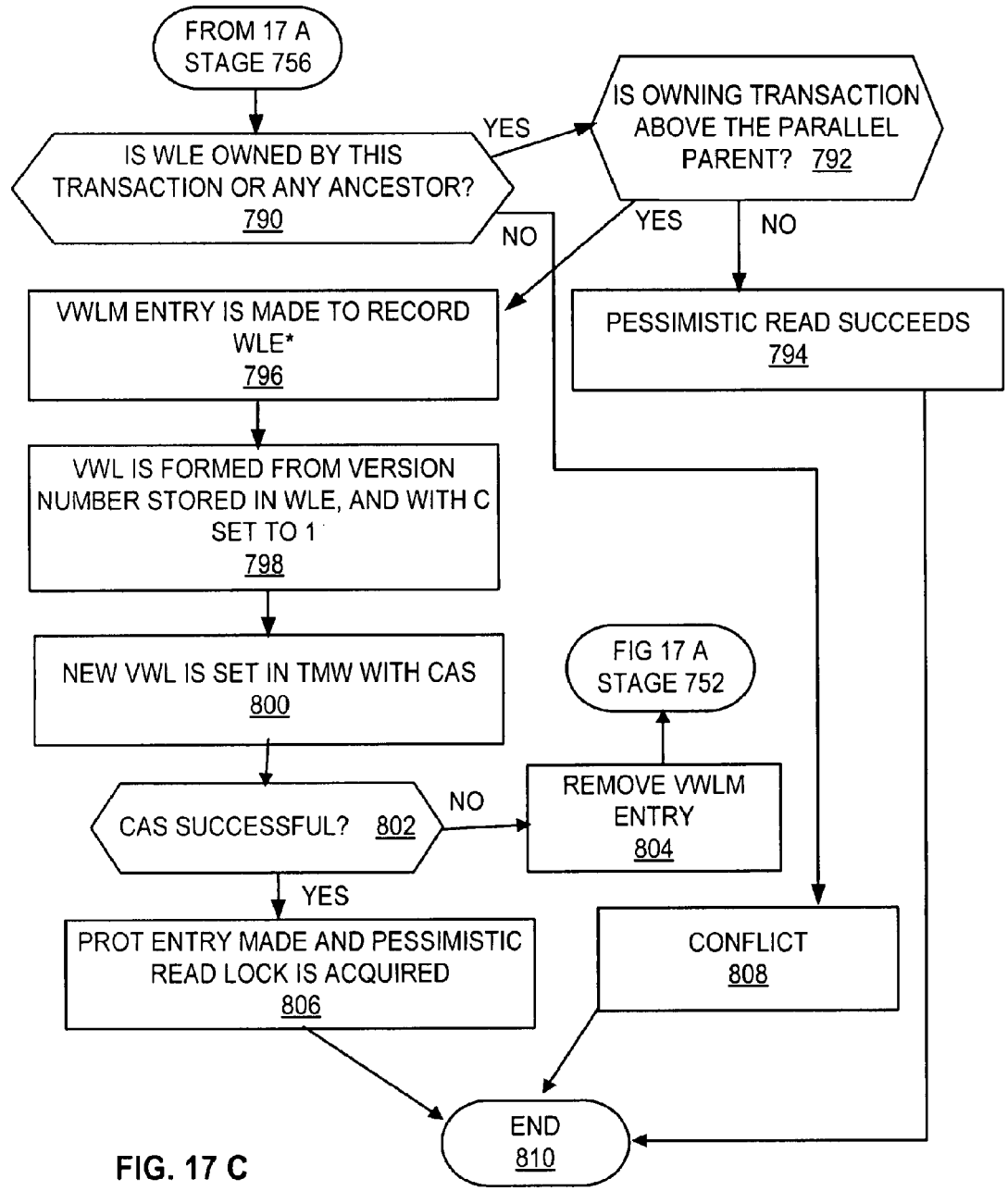
Figure 17:
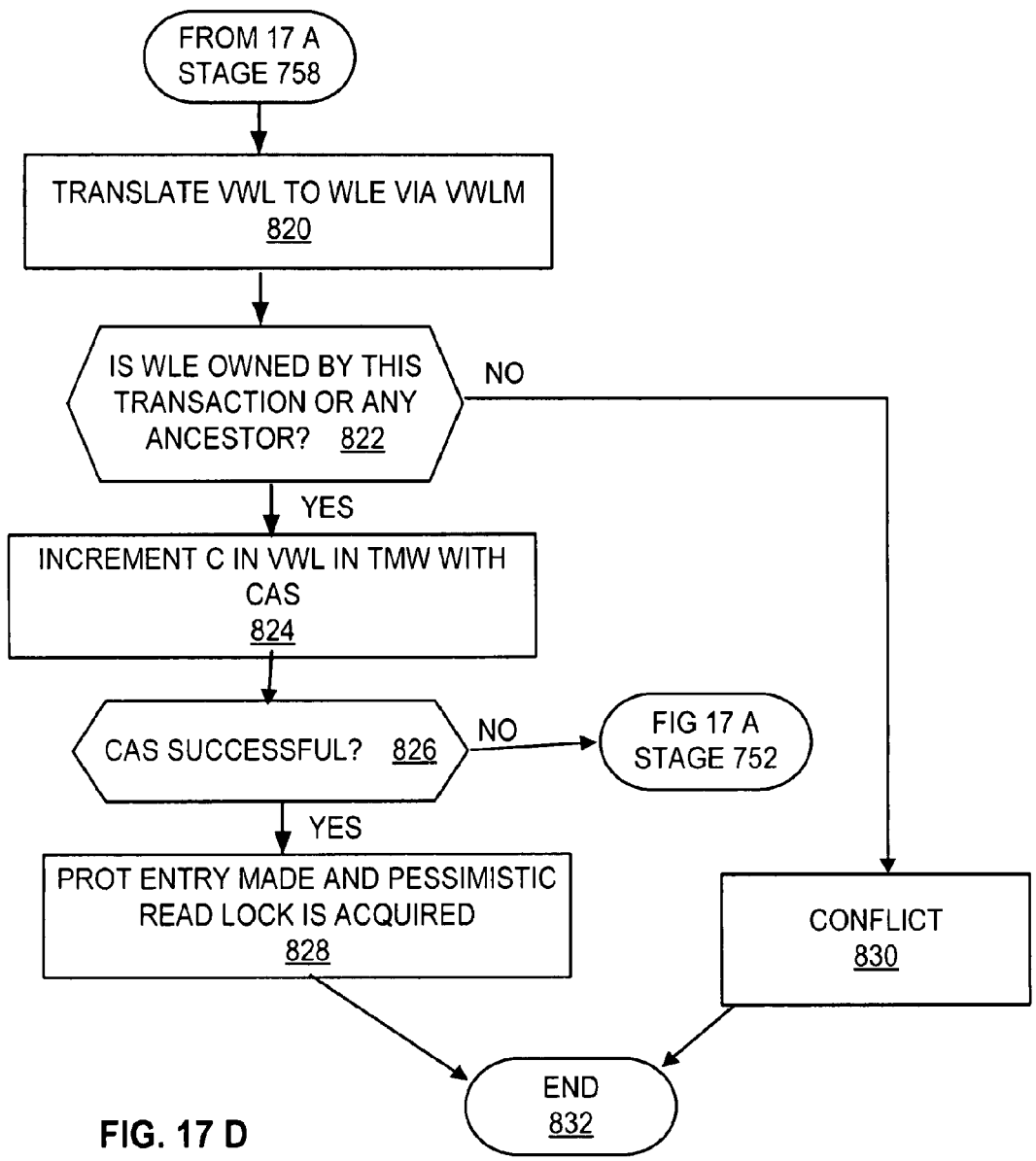

FIGS. 8 and 9 illustrate one implementation of the stages involved in properly handling a nested transaction acquiring a write lock. A new write lock is a write lock acquired for the first time within a nest of transactions, and a duplicate write lock is a write lock which a nested transaction may acquire on an object that an ancestor transaction currently has write locked. The process begins at start point 370 with a nested transaction reading a transactional memory word (stage 372). If the transactional memory word is not a V/C pair (decision point 374), then the process continues with FIG. 9, stage 404, described in the next section. If the transactional memory word is a V/C pair with C (count of pessimistic readers) greater than zero (decision point 375), then the process of FIG. 16 is performed to handle pessimistic read to write lock upgrade. If the transactional memory word is a V/C pair with C equal to zero (decision point 375), this indicates that the transactional memory word is not pessimistically locked for read or write by any transaction, therefore allowing acquisition of a new write lock. To do so, the system forms a new write log entry to record the version number and appends the write log entry to the transaction's write log (stage 376). A compare and swap is then performed to switch the transactional memory word value from a V/C pair to a write log entry pointer (e.g. WLE*) (stage 378). If the compare and swap is successful (decision point 380), then the lock was obtained successfully (stage 382). If the compare and swap is not successful (decision point 380), then there is a conflict (stage 384) and the lock was not obtained successfully. The process ends at end point 386.

Continuing with FIG. 9, if the TMW is not a V/C pair (decision point 374 on FIG. 8), and if the transactional memory word is not a versioned write lock (decision point 404), then it is a WLE* to $WLE_A$ and the process continues at stage 408. If the transactional memory word is a versioned write lock (decision point 404), then the global version write lock map is used to retrieve the underlying WLE* to $WLE_A$ (stage 406). If $WLE_A$ is not owned by any ancestor of the transaction (decision point 408), then there is a conflict (stage 410) and the process ends at end point 420. If $WLE_A$ is owned by an ancestor (decision point 408), then a new $WLE_B$ is formed to record $WLE_A$ and $WLE_B$ is appended to the transaction's write log (stage 412). A compare and swap is then performed to switch the transactional memory word value from $WLE_A$* to $WLE_B$*(stage 414). If the compare and swap was successful (decision point 416), then the lock was successfully obtained (stage 418). If the compare and swap was not successful (decision point 416), then there is a conflict (stage 410) and the lock was not successfully obtained. The process ends at end point 420.

Figure 10:
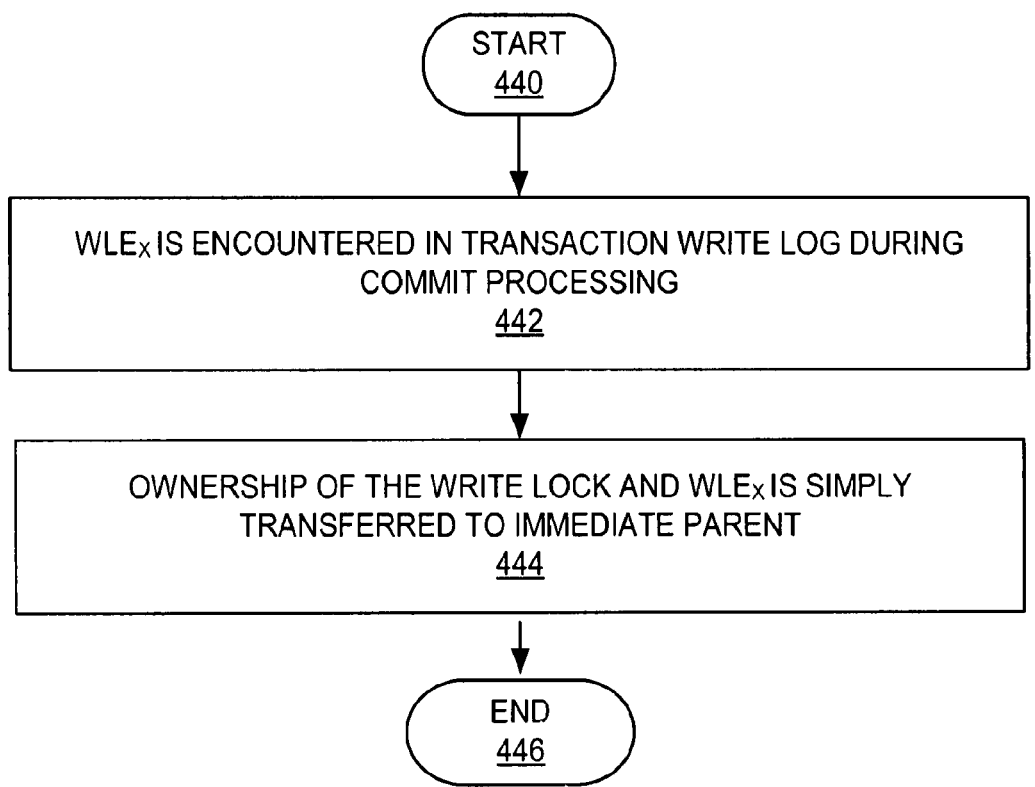
FIG. 10 is a process flow diagram for one implementation of the system of FIG. 1 that illustrates the stages involved in properly handling a nested transaction releasing any kind of write lock for commit.

FIG. 10 illustrates one implementation of the stages involved in properly handling a nested transaction releasing any kind of write lock for commit. The process begins at start point 440 with WLE being encountered in a transaction write log during commit processing (stage 442). Ownership of the write lock, and $WLE_X$, is simply transferred to the immediate parent transaction (stage 444). By transferring ownership from a parallel nested transaction to the parent transaction on commit, other siblings now find that they can acquire the write lock for themselves now. Likewise, the act of acquiring a duplicate write lock prevents siblings from being able to acquire the write lock for themselves. The process ends at end point 446.

Figure 11:
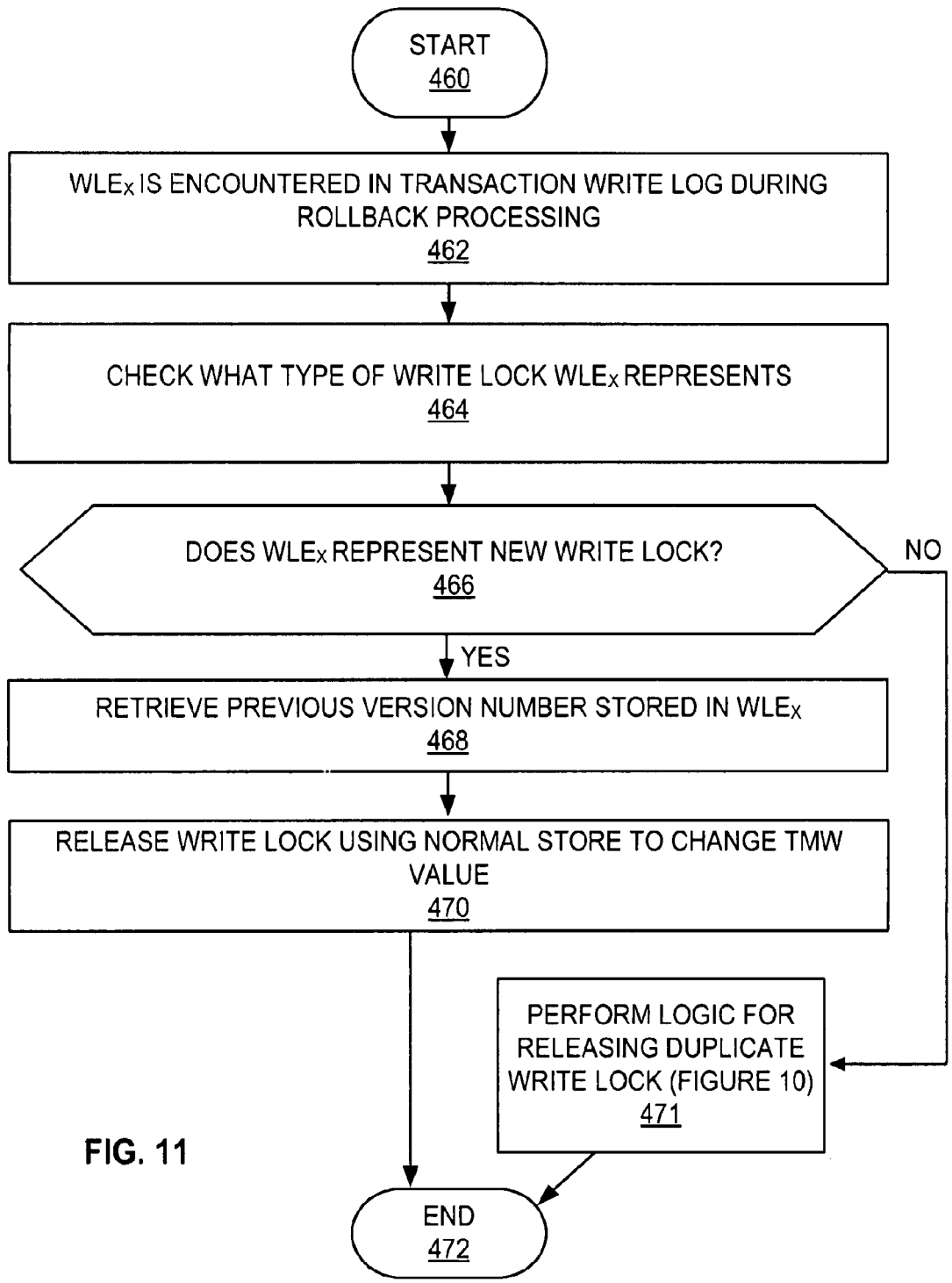
FIG. 11 is a process flow diagram for one implementation of the system of FIG. 1 that illustrates the stages involved in properly handling nested transaction releasing new write lock for rollback.

FIG. 11 illustrates one implementation of the stages involved in properly handling a nested transaction releasing a new write lock for rollback. The process begins at start point 460 with $WLE_X$ being encountered in a transaction write log during rollback processing (stage 462). The system checks to see what type of write lock $WLE_X$ represents (stage 464). If $WLE_X$ does not represent a new write lock (decision point 466), then logic for releasing a duplicate write lock is performed (stage 471), as described in FIG. 12 for one implementation. If $WLE_X$ represents a new write lock (decision point 466), then the previous version number stored in $WLE_X$ is retrieved (stage 468). The location of the transactional memory word is retrieved from $WLE_X$ and the write lock is released using a normal store operation to change the transactional memory word value to a V/C pair appropriate for the type of system (in-place or buffered) (stage 470). In one implementation of a buffered system, the transactional memory word value is changed back to represent the original version number. In one implementation of an in-place system, then the transactional memory word value is changed to represent the original version number plus one. The process ends at end point 472.

Figure 12:
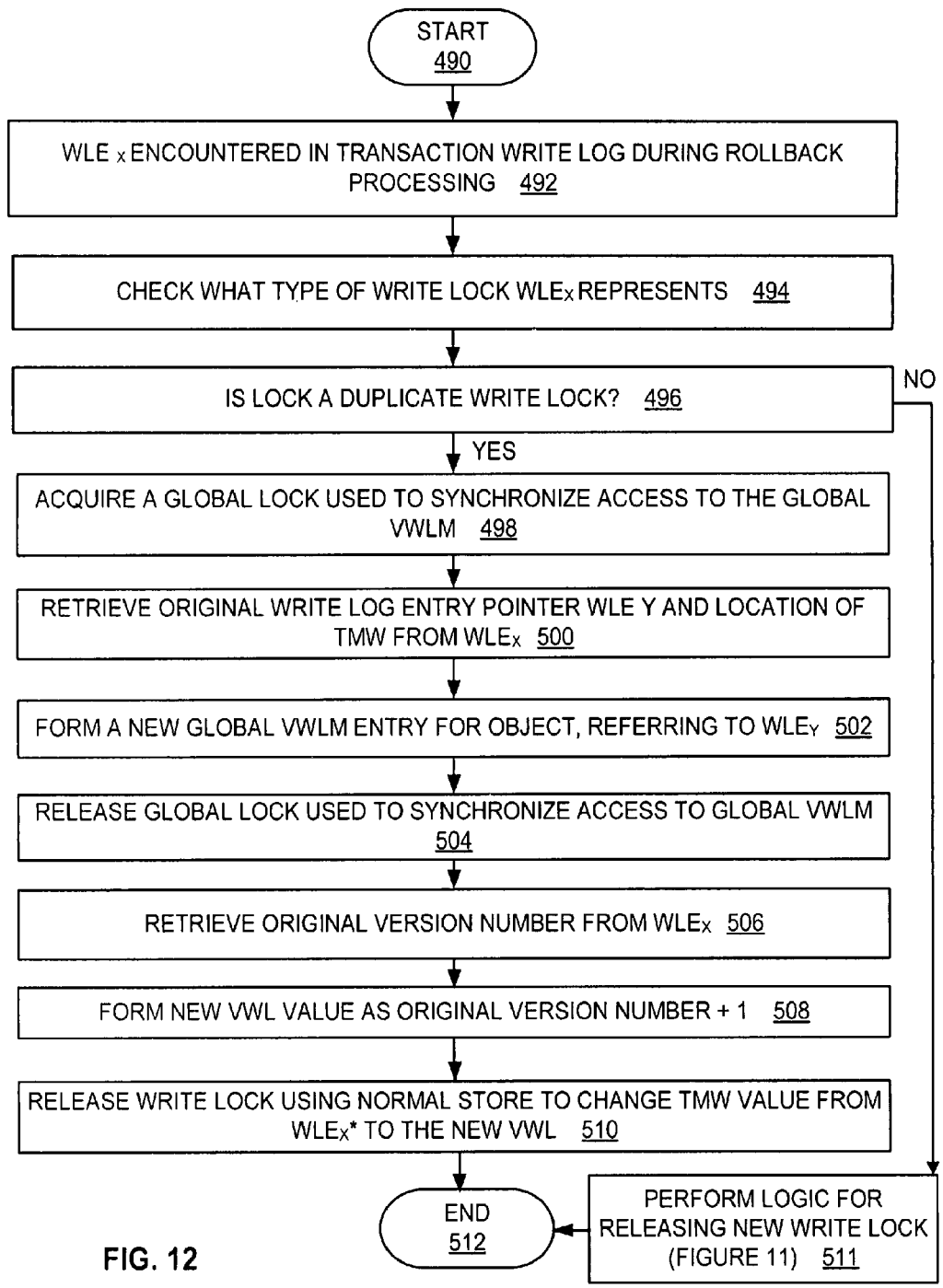
FIG. 12 is a process flow diagram for one implementation of the system of FIG. 1 that illustrates the stages involved in properly handling a nested transaction releasing a duplicate write lock for rollback.

FIG. 12 illustrates one implementation of the stages involved in properly handling a nested transaction releasing a duplicate write lock for rollback. In one implementation, this process is used only for systems that increment an object's version number on rollback, i.e., an in-place system. In some implementations of buffered systems, the version number is not increased during rollback. In these systems, the process for releasing a new write lock (FIG. 11) may be used to release a duplicate write lock. The process begins at start point 490 with $WLE_X$ being encountered in a transaction write log during rollback processing (stage 492). The system checks to see what type of write lock $WLE_X$ represents (stage 494). If the lock is not a duplicate write lock (decision point 496), then logic for releasing a new write lock is performed (stage 511), as described in FIG. 11 for one implementation. If the lock is a duplicate write lock, then a global lock is acquired that is used to synchronize access to the global versioned write lock map (stage 498). The original write log entry pointer $WLE_Y$* and the location of the transactional memory word are retrieved from $WLE_X$ (stage 500). A new global versioned write lock map entry is formed for the object, referring to $WLE_Y$ (stage 502). The global lock that is used to synchronize access to the global versioned write lock map is then released (stage 504). The original version number is retrieved from $WLE_X$ (stage 506), and a new versioned write lock value is formed as the original version number+1 (stage 508). The write lock is released using a normal store operation to change the transactional memory word value from $WLE_X$* to the new versioned write lock (stage 510). The process ends at end point 512.

Figure 13:
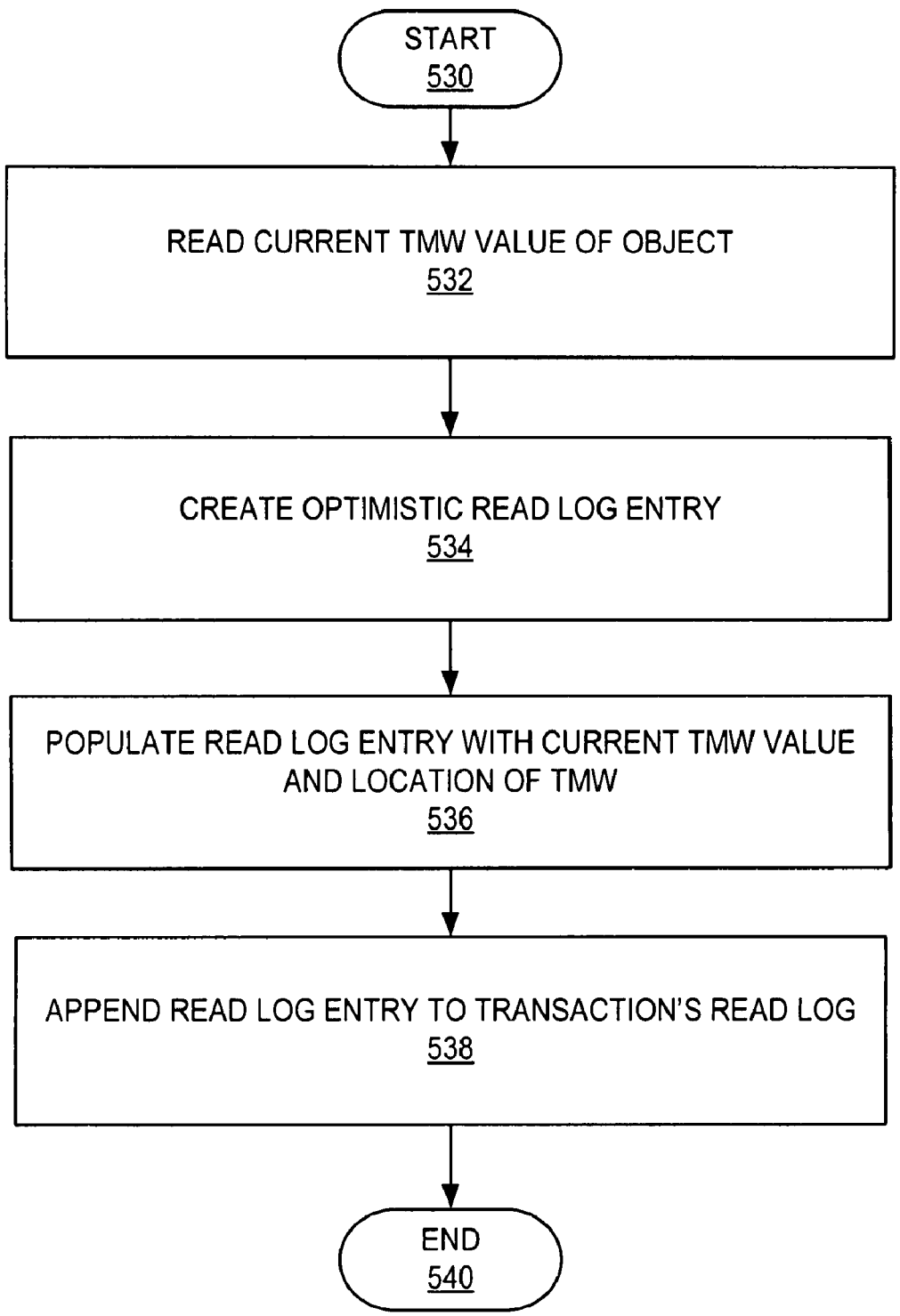
FIG. 13 is a process flow diagram for one implementation of the system of FIG. 1 that illustrates performing optimistic read lock acquisition.
Figure 14:
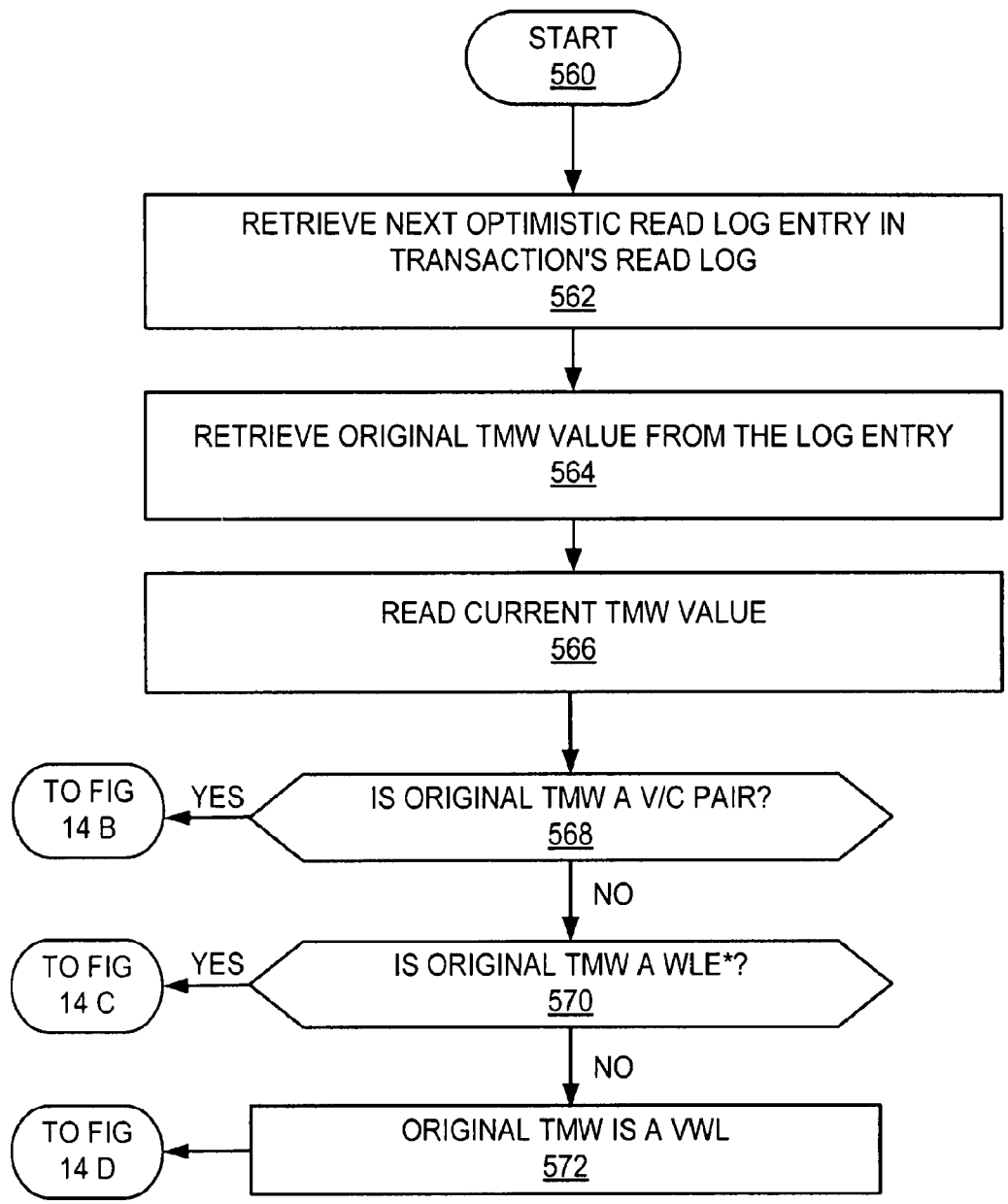
FIGS. 14A-14D are process flow diagrams for one implementation of the system of FIG. 1 that illustrates performing optimistic read validation.
Figure 14:
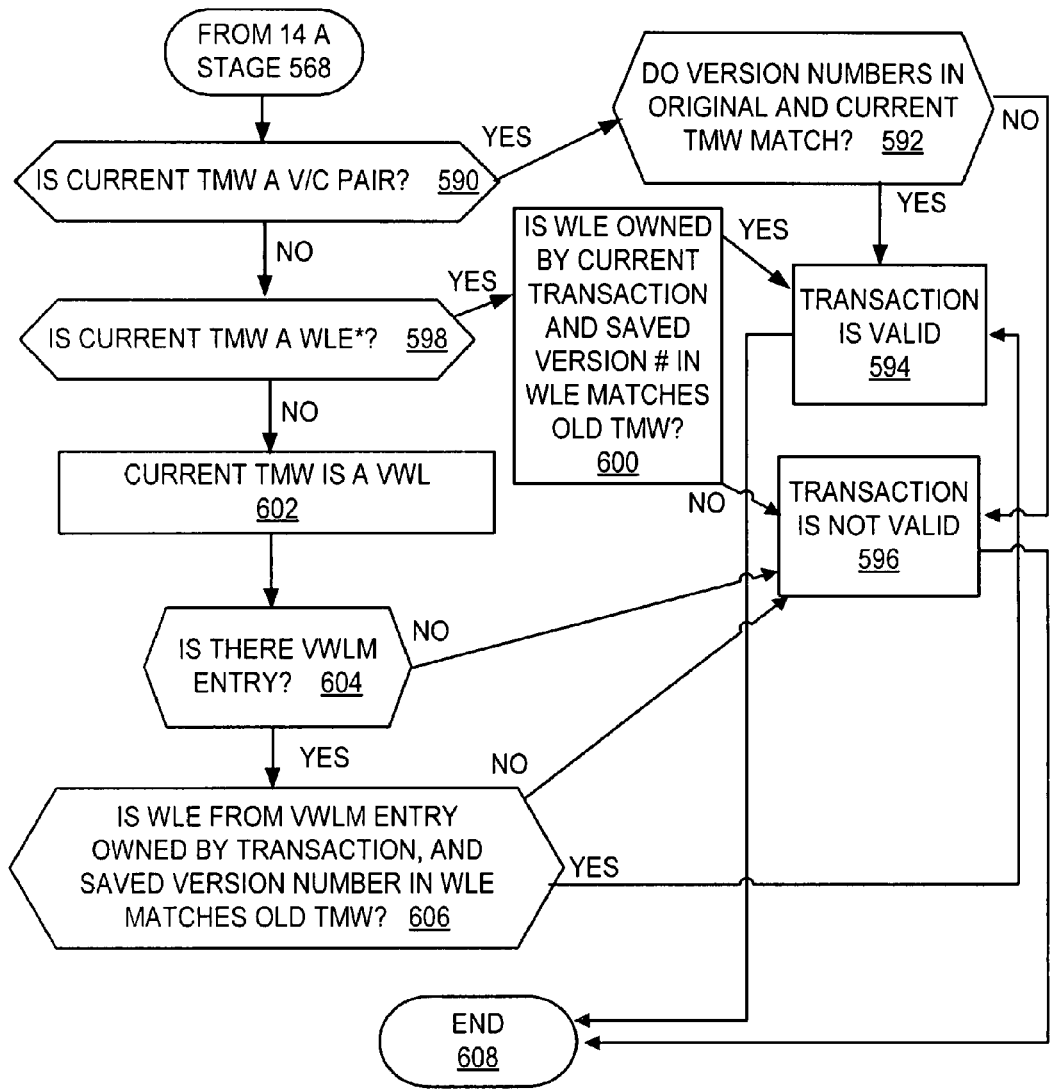
Figure 14:
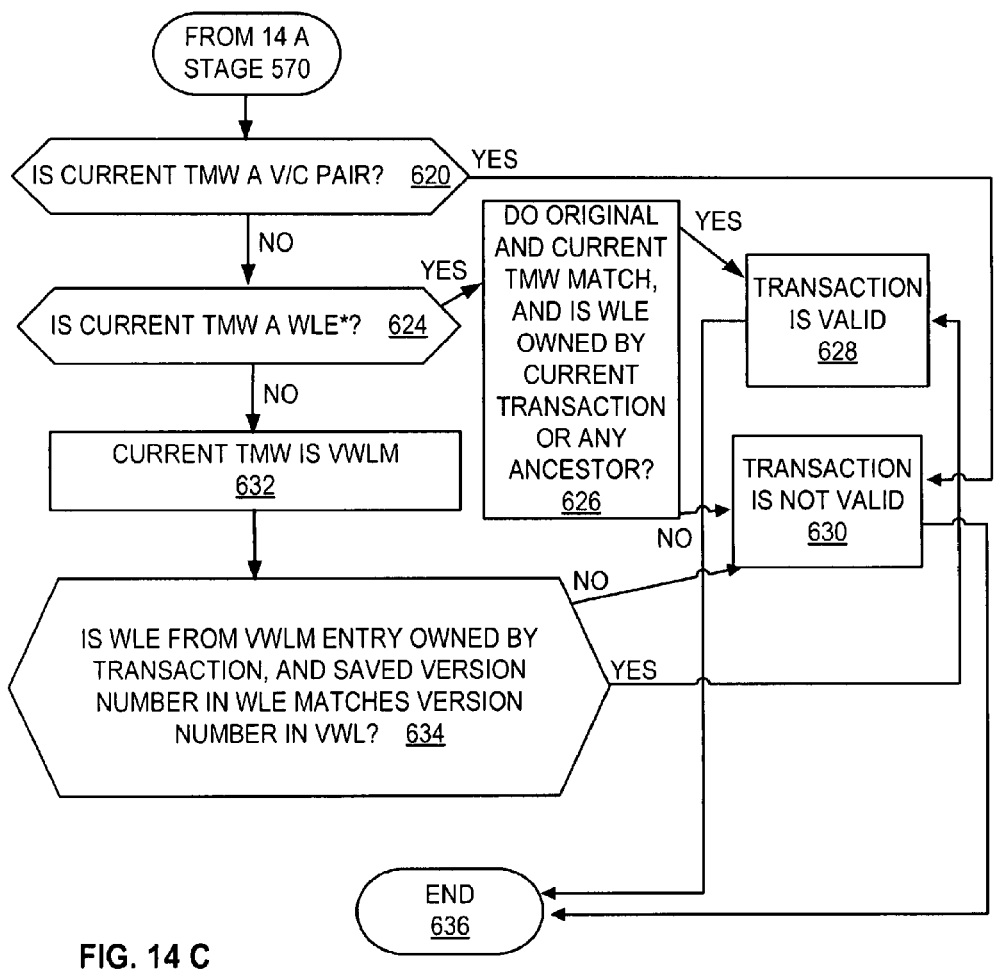
Figure 14:
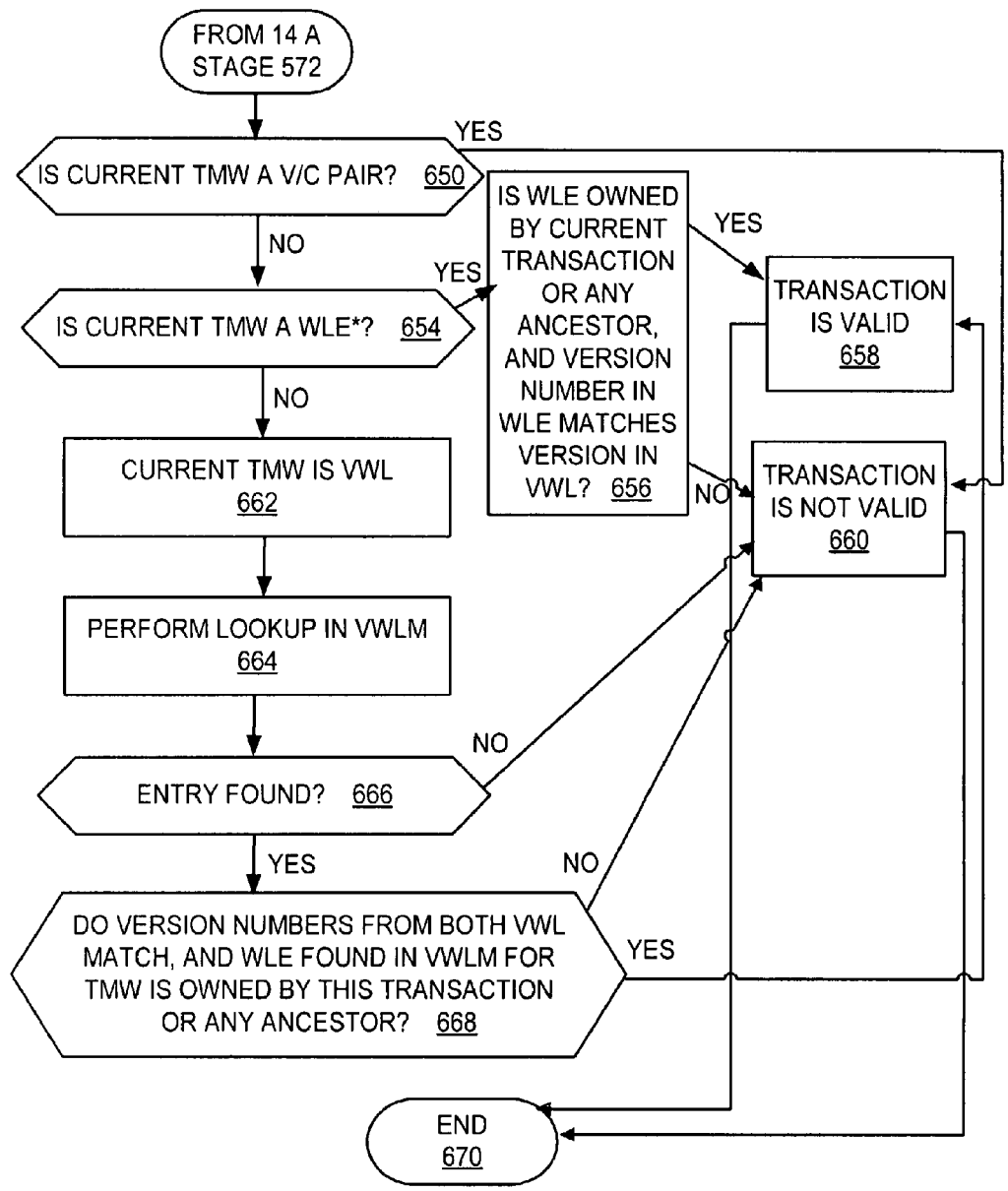

FIG. 13 is a process flow diagram for one implementation of the system of FIG. 1 that illustrates performing optimistic read lock acquisition. The process begins at start point 530 with the object's current TMW value being read when a transaction performs an optimistic read on an object (stage 532). An optimistic read log entry is created (stage 534) and populated with the current TMW value and the location of the TMW (stage 536). The read log entry is appended to the transaction's read log (stage 538). In one implementation, this process is the same for all types of transactions: top-level, simple nested, or parallel nested transactions. The process ends at end point 540.

FIGS. 14A-14D are process flow diagrams for one implementation of the system of FIG. 1 that illustrates performing optimistic read validation. The process begins at start point 560 with considering each optimistic read log entry in the transaction's read log when attempting to commit a transaction or otherwise determine if the transaction is valid (stage 562). The original value of the TMW is retrieved from the read log entry (stage 564), and the current value of the TMW is read (stage 566). Note that in each case, if the system is using write abort compensation maps (WACM) (described in FIG. 19) then the current aggregate WACM (formed during validation or commit processing) is consulted whenever there is a difference in two version numbers. If the original TMW is a V/C pair (decision point 568), then the process described in FIG. 14B is performed. If the original TMW is a WLE* (decision point 570), then the process described in FIG. 14C is performed. If the original TMW is neither a V/C pair nor a WLE*, then the original TMW is a VWL (stage 572), and the process of FIG. 14D is performed. Let's look at each of these scenarios in further detail.

FIG. 14B covers more details on an exemplary process performed during optimistic read validation in one implementation when the original TMW is a V/C pair (decision point 568). If the current TMW is a V/C pair (decision point 590), and the version numbers in the original TMW and the current TMW match (decision point 592), then the transaction is valid (stage 594). If the current TMW is a V/C pair (decision point 590), and the version numbers in the original TMW and the current TMW do not match (decision point 592), then the transaction is invalid (596).

If the current TMW is instead a WLE* (decision point 598), and if the WLE is owned by the transaction, and the saved version number in the WLE matches the old TMW (decision point 600), then the transaction is valid (stage 594). If the current TMW is not a V/C pair (decision point 590), and the current TMW is not a WLE* (decision point 598), then the TMW is a VWL (stage 602). A synchronized lookup is made in the VWLM using the address of the locked object. If there is no VWLM entry (decision point 604), then the transaction is invalid (stage 596). If there is an entry (decision point 604), then the VWLM entry is used to retrieve the WLE* that the VWL replaced. If the WLE is owned by the transaction, and the saved version number in the WLE matches the old TMW (decision point 606), then the transaction is valid (stage 594). Otherwise, the transaction is invalid (stage 596). The process ends at end point 608.

Turning now to FIG. 14C, an exemplary process is shown that is performed during optimistic read validation in one implementation when the original TMW is a WLE*. If the current TMW is a V/C pair (decision point 620), then the current transaction is not valid (stage 630). If the current TMW is not a V/C pair (decision point 620), but is instead a WLE* (decision point 624), then the system checks to see if the original and current TMW match, and if the WLE is owned by the current transaction or any ancestor (decision point 626). If both of these criteria are met, then the transaction is valid (stage 628). Otherwise, the transaction is invalid (stage 630).

If the current TMW is not a V/C pair (decision point 620), and is not a WLE* (decision point 624), then the current TMW is a VWL (stage 632). If the WLE from the original TMW is owned by this transaction or any ancestor, and if the version number saved in the WLE matches the version number in the VWL (decision point 634), then the transaction is valid (stage 628). Otherwise, the transaction is not valid (stage 630). The process ends at end point 636.

Turning now to FIG. 14D, an exemplary process is shown that is performed during optimistic read validation in one implementation when the original TMW is a VWL. If the current TMW is a V/C pair (decision point 650), then the transaction is not valid due to a conflict (stage 660). If the current TMW is not a V/C pair (decision point 650), but instead is a WLE* (decision point 654), then the system checks to see if the WLE is owned by the current transaction or any ancestor, and if the version number stored in the WLE matches the version in the VWL (decision point 656). If both of these criteria are met, then the transaction is valid (stage 658). Otherwise, the transaction is not valid (stage 660).

If the current TMW is not a V/C pair (decision point 650), and the current TMW is not a WLE* (decision point 654), then the current TMW is a VWL (stage 662). A lookup is performed in the VWLM to translate the VWL to a WLE* (stage 664). If an entry is not found (decision point 666), then the transaction is not valid (stage 660). Otherwise, if an entry is found (decision point 666), then the system checks to see if the version numbers of the original and current VWL match, and if the WLE found in the VWLM for the TMW is owned by this transaction or any ancestor (decision point 668). If both criteria are met, then the transaction is valid (stage 658). Otherwise, the transaction is invalid (stage 660). The process ends at end point 670.

Correct operation of pessimistic reads in a system with simple closed nested transactions requires the use of a duplication detection data structure called a Pessimistically Read Object Table (PROT). Each top-level transaction creates a PROT either at transaction start, or lazily at the first pessimistic read operation. When the transaction, or any descendent, attempts to acquire a pessimistic read lock on an object, it consults the PROT to determine if a pessimistic read lock has already been acquired. If the object is in the PROT, then that object is already read locked by the nest of transactions. If the object is not in the PROT, and if the object is not currently write locked by another transaction, then a pessimistic read lock is acquired using a CAS operation to increment C (the count of pessimistic readers) in the V/C pair stored in the object's TMW. If the CAS operation is successful, then an entry is made in the PROT to record the fact that the nest now has the object locked for pessimistic reads. When the pessimistic read lock is released, either during top-level commit or rollback, C is decremented (with a CAS again), and the PROT entry is removed. Let's now look at how PROTs are used with parallel nested transactions.

Figure 15:
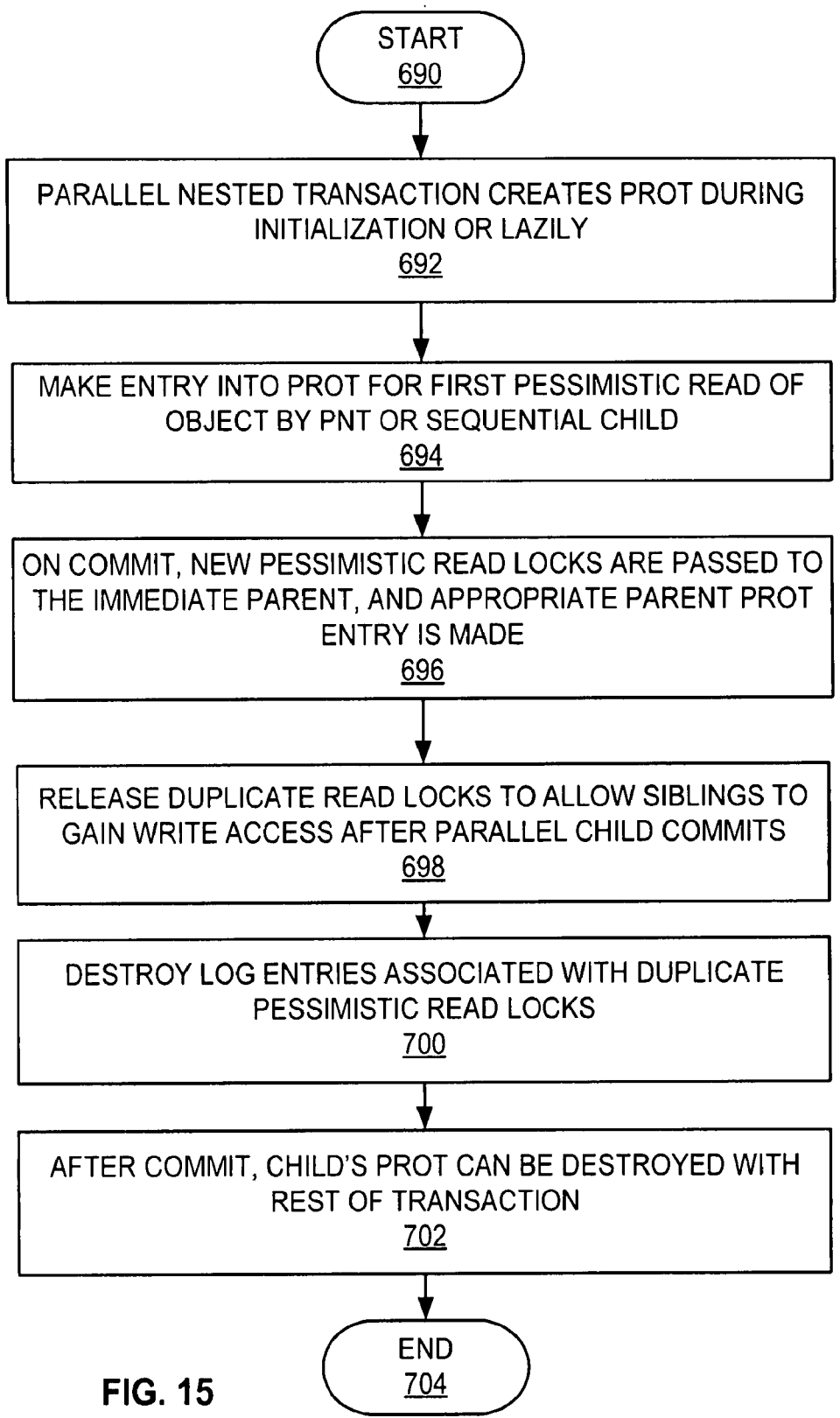
FIG. 15 is a process flow diagram for one implementation of the system of FIG. 1 that illustrates the stages involved in ensuring correct operations of pessimistic reads with parallel nested transactions.

FIG. 15 illustrates one implementation of the stages involved in ensuring correct operation of pessimistic reads with parallel nested transactions. The process begins at start point 690 with a parallel nested transaction creating a pessimistic duplication detection data structure (called a PROT, as described previously) during initialization, or lazily during acquisition of the first pessimistic read lock by the parallel nested transaction (stage 692). This data structure is used by the system when a transaction attempts to upgrade a pessimistic read lock to a write lock. An entry is made into the PROT for the first pessimistic read of an object made by the parallel nested transaction or any sequential child (stage 694). On commit, new pessimistic read locks are passed to the immediate parent, and an appropriate parent PROT entry is made (stage 696). Duplicate read locks are released to allow siblings to gain write access after a parallel child commits (stage 698). The system then destroys log entries associated with duplicate pessimistic read locks (stage 700). After commit, a child's PROT can be destroyed with the rest of the transaction (stage 702). The process ends at end point 704.

FIG. 16 illustrates one implementation of the stages involved in upgrading pessimistic read locks to write locks. The process begins at start point 720 with discovering that a write lock that is desired for an object is already opened for pessimistic read(s) (stage 722). The child's PROT is queried (stage 724) to look at a current count of readers and decide if the current transaction can account for all those reads (stage 726). If the result accounts for all of the pessimistic readers, then the child may attempt to upgrade to write lock as usual (stage 728). If there are still unaccounted for readers, then the child must query all ancestor PROT's to determine if it may upgrade to a write lock (stage 730). If any ancestor is a parallel parent then we must consider the parallel parent's PROT as well as the PROT of any parallel siblings that have already committed. These sibling PROT's are held in the parallel parent's log via PNTE's. Proper synchronization is required to ensure that there is race-free access to these sibling PROT's. This synchronization is accomplished by ensuring that a PNT does not access its PROT after placing it in the associated PNTE. If the ancestors and any committed parallel siblings make up for the extra pessimistic readers, then the child may attempt to upgrade to a write lock as usual (stage 732). In one implementation, the upgrade is accomplished as follows. A new write log entry is formed and added to the PNT's log. The current value of the TMW is placed in the WLE for use during rollback and commit processing. If the current value of the TMW is a VWL, then the VWLM is used, with proper synchronization, to translate the VWL to a WLE* first. A CAS is used to acquire the write lock. If the CAS is successful, then the upgrade worked, otherwise there is conflict. The process ends at end point 734.

Now it is time to describe the exemplary process shown in FIGS. 17A-17D for performing pessimistic read lock acquisition when in a parallel nested transaction. The process begins with 17A with reading the current TMW (stage 752). If the TMW is a V/C pair (decision point 754), then the process described in FIG. 17B is performed. If the TMW is a WLE* (decision point 756), then the process described in FIG. 17C is performed. If the TMW is not a V/C pair (decision point 754), and is not a WLE* (decision point 756), then the TMW is a VWL (stage 758), and the process described in FIG. 17D is performed. Each of these scenarios will now be looked at in further detail.

Turning now to FIG. 17B, if the TMW is a V/C pair, then the transaction's PROT is consulted to determine if it already holds a pessimistic read lock on the object (decision point 769). If there is a PROT entry, then the process ends at end point 776. If there is no PROT entry (decision point 769), then a compare and swap (CAS) is used to increment C, which is the count of pessimistic readers (stage 770). If the CAS is successful (decision point 772), then the lock is acquired and a PROT entry is made (stage 774). If the CAS fails (decision point 772), then try again, which is illustrated by referring to FIG. 17A, stage 752.

As shown in FIG. 17C, if the TMW is a WLE*, and the WLE is owned by the current transaction or any ancestor (decision point 790), then the system determines if the owning transaction is below or above the parallel parent (decision point 792). If the owning transaction is below the parallel parent (decision point 792), then the pessimistic read succeeds (stage 794). If the owning transaction is above the parallel parent (decision point 792), then the system switches the TMW to a VWL to coordinate with siblings. To do so, a VWLM entry is made to record the WLE* (stage 796), with proper synchronization, and a VWL is formed from the version number stored in the VWL, and with C (the count of pessimistic readers) set to 1 (stage 798). The new VWL is set in the TMW with a CAS (stage 800). If the CAS is successful, a PROT entry is made and the pessimistic read lock is acquired (stage 806). If the CAS is not successful, then the VWLM entry is removed (stage 804), and then we try again by returning to FIG. 17A, stage 752. The process ends at end point 810.

As shown in FIG. 17D, if the TMW is a VWL, then the VWL is translated to a WLE* via the VWLM (stage 820), with proper synchronization. If the WLE is owned by this transaction or any ancestor (decision point 822), then a CAS is used to increment C (count of pessimistic readers) in the VWL in the TMW (stage 824). If the CAS is successful (decision point 826), then a PROT entry is made and the lock is acquired. If the CAS fails, then we try again by continuing with FIG. 17A, stage 752. If the WLE is not owned by this transaction or any ancestor (decision point 822), then there is a conflict (stage 830). The process ends at end point 832.

Figure 18:
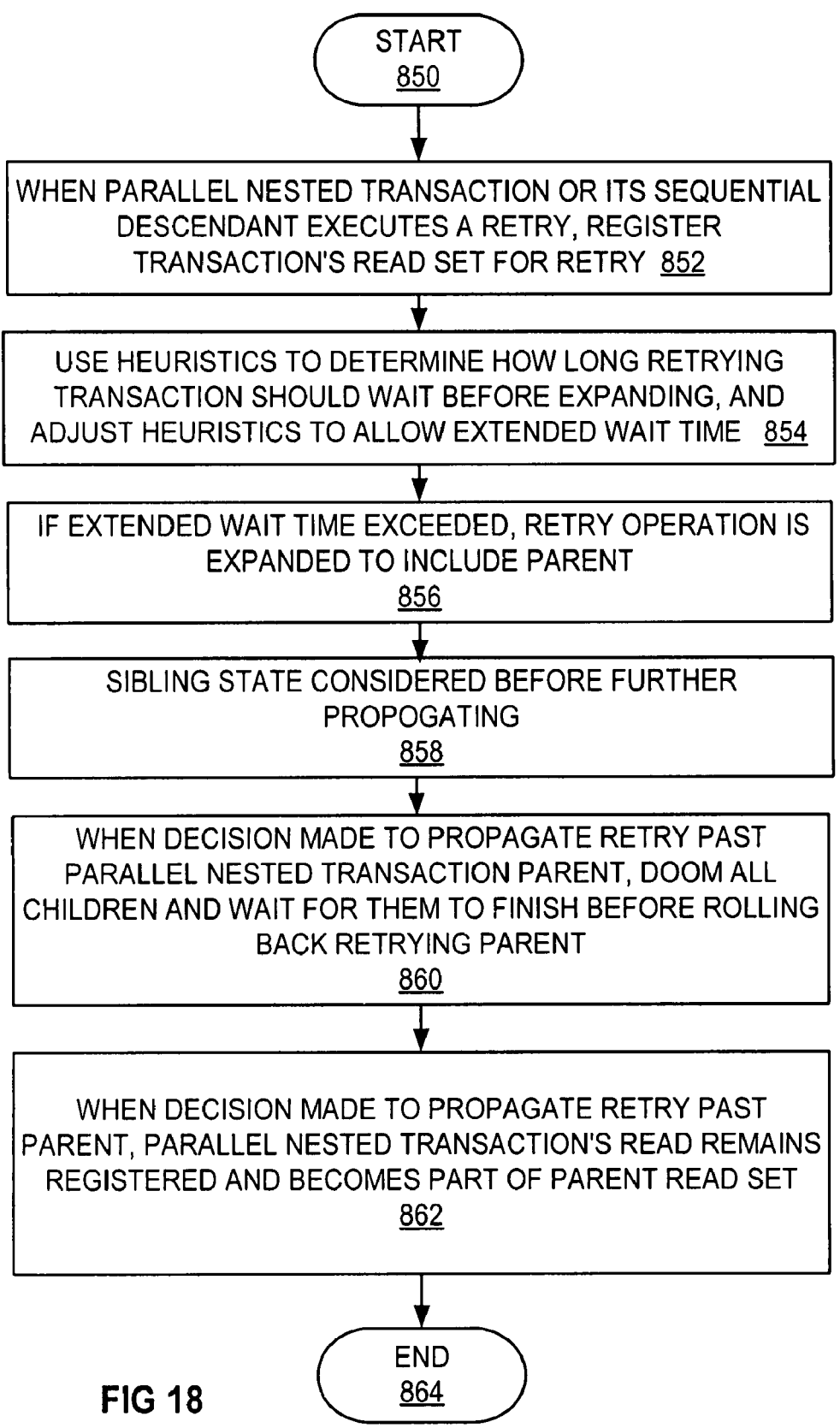
FIG. 18 is a process flow diagram for one implementation of the system of FIG. 1 that illustrates the stages involved in allowing retry to work correctly with parallel nested transactions.

FIG. 18 illustrates one implementation of the stages involved in allowing retry to work correctly with parallel nested transactions. Before delving into the details of FIG. 18 and the discussion of allowing retry to work with parallel nested transactions, it is first necessary to provide some background information on retry operations of one implementation. A retry operation allows basic communication between transactions. When a transaction executes a retry operation, its effects are rolled back and execution is suspended until something that the transaction read changes. When a change is detected, the transaction is re-executed. Retry operations can be used for some very common data structures, like blocking queues. For example, a transaction could check to see if a queue is empty and then retry if it is empty, or remove an element if the queue is not empty. The transaction will block while the queue remains unchanged and re-execute when the state of the queue changes, which gives the transaction another opportunity to complete.

In one implementation, when a transaction executes a retry operation, the system registers for waits on every read in the read set of the retrying transaction. The retrying transaction waits for notification that something in the read set has changed. A wait notification is initiated from a particular transaction releasing a write lock. A transaction knows if notification is required in one of two ways. In the first way, if the transactional memory word contained a waiters bit during write lock acquisition, then during release the transactional memory word is looked up in an object waiters map, and each waiting transaction is signaled. In the second way, if a writing transaction finds a global count of waiting transactions to be greater than zero after releasing all write locks, it will use a transaction waiters map to determine which transactions, if any, were waiting on locations written to and need to be signaled. In each case, the write lock is released using a normal store operation.

In another implementation, a progressive retry operation is started with a rollback of just the retrying nested transaction and waiting on its read set. After waiting for some particular time or for some other condition to be met, a backoff process is performed to rollback an immediate parent of the retrying transaction, increasing the size of the original wait set. The backoff process is repeated until rollback of a top-most parent, adding an additional wait for each next parent. The aggregate wait set is associated with the top-most parent and any notification will result in re-execution of the top-most parent.

Returning now to FIG. 18, an explanation of how retry can be used with parallel nested transactions will now be discussed. The process begins at start point 850 when a parallel nested transaction or any sequential descendant executes a retry, the system registers the transaction's read set for retry as usual (stage 852). The system includes heuristics to determine how long a retrying transaction should wait before expanding the retry operation to include some subset of the transaction's ancestors (stage 854). These heuristics are adjusted for parallel nested transactions and allow an extended wait time so long as other parallel siblings are active. If that extended wait time is exceeded, then the retry operation is expanded to include the parent (stage 856). The state of the siblings is considered before propagating further (stage 858). When a decision is made to propagate a retry past a parallel nested transaction parent, all children are doomed, and then must finish before a retrying parent is rolled back (stage 860). When a decision is made to propagate a retry past the parent, the parallel nested transaction's read set remains registered and becomes part of a parent read set (stage 862). Note that the read sets of any parallel siblings that have already committed into the parent are made part of the wait set along with the parent's read set. Any parallel siblings that were aborted by the decision to propagate the retry to the parent do not contribute to the wait set. The process ends at end point 864.

Figure 19:
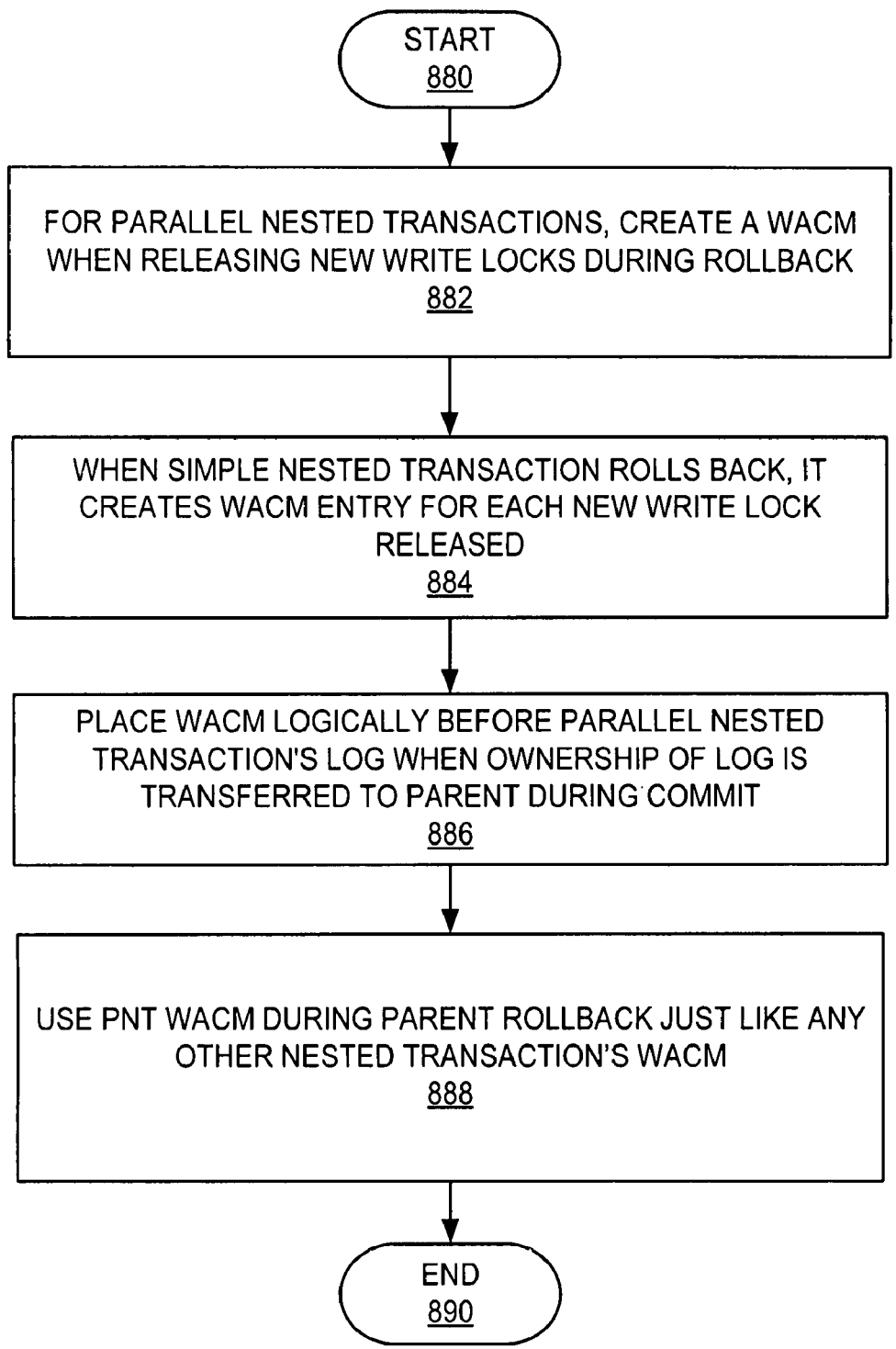
FIG. 19 is a process flow diagram for one implementation of the system of FIG. 1 that illustrates the stages involved in using write abort compensation maps with parallel nested transactions.

FIG. 19 illustrates one implementation of the stages involved in using write abort compensation maps with parallel nested transactions. Before getting into the details of FIG. 19 and how write abort compensation maps can be used with parallel nested transactions, it is necessary to provide some background information regarding write abort compensation maps of one implementation.

Write abort compensation maps can be used to detect falsely doomed parent transactions of nested children in transactional memory systems that use in-place writes. A write abort compensation map (or other storage mechanism) tracks the release count for each lock released for each nested transaction that rolls back. The number of times the nested transactions release a write lock is recorded in their respective write abort compensation map. The release counts can be used during a validation of a parent transaction to determine if an apparently invalid optimistic read is really valid.

In one implementation, while processing a parent transaction log, any write abort compensation maps seen for nested child transactions are combined into an aggregated write abort compensation map in the parent. If the optimistic read failed to validate due to a version number mismatch, then the aggregated write abort compensation map is consulted to retrieve a particular variable's write lock release count for the nested child transactions. If a difference in version numbers exactly matches the write lock release count for the nested child transactions, then the optimistic read is valid.

Returning now to FIG. 19, let's look at how write abort compensation maps can be used with parallel nested transactions. The process begins at start point 880 with creating a write abort compensation map (WACM) when releasing new write locks during rollback of a parallel nested transaction (stage 882). When a nested transaction rolls back, it creates a WACM entry for each new write lock released (stage 884). The WACM is logically placed before the parallel nested transaction's log when ownership of the log is transferred to the parent during commit (stage 886). These PNT WACM's will be used during parent rollback just like any other nested transaction's WACM, as described above, and will ensure correct validation of parent optimistic reads (stage 888). The process ends at end point 890.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for using versioned write locks with parallel nested transactions comprising:
   executing, within a transactional memory, closed nested transactions for a parent transaction concurrently as parallel nested transactions;
   when a transactional memory word changes from a write lock to a versioned write lock, making an entry in a global versioned write lock map to store a pointer to a write log entry that the versioned write lock replaced; and
   when the versioned write lock is encountered during the executing of the parallel nested transactions, consulting the global versioned write lock map to translate the versioned write lock to the pointer to the write log entry.

2. The method of claim 1, wherein by using the versioned write lock, a parallel nested transaction can acquire and release locks held by the parent transaction to synchronize properly without breaking an isolation boundary of the parent transaction.

3. The method of claim 1, wherein a version number stored in the transactional memory word always increments, whether held in a version count pair or the versioned write lock.

4. The method of claim 1, comprising:
   when acquiring a pessimistic read, switching the transactional memory word to the versioned write lock to provide room for storing a count of pessimistic readers, with the versioned write lock now indicating that there is a possibility that a sibling transaction has performed a pessimistic read on an object that the parent transaction has already write locked.

* * * * *